(12) United States Patent
Obayashi et al.

(10) Patent No.: US 7,677,810 B2
(45) Date of Patent: Mar. 16, 2010

(54) BEARING WASHER FOR THRUST BEARING AND THRUST BEARING

(75) Inventors: Kousuke Obayashi, Iwata (JP); Yasuyuki Watanabe, Iwata (JP)

(73) Assignee: NTN Corporation, Osaka (JP)

( * ) Notice: Subject to any disclaimer, the term of this patent is extended or adjusted under 35 U.S.C. 154(b) by 1091 days.

(21) Appl. No.: 11/329,092

(22) Filed: Jan. 11, 2006

(65) Prior Publication Data

US 2006/0165334 A1    Jul. 27, 2006

(30) Foreign Application Priority Data

| Jan. 21, 2005 | (JP) | ............................. 2005-014514 |
| Jan. 21, 2005 | (JP) | ............................. 2005-014573 |
| Jan. 21, 2005 | (JP) | ............................. 2005-014576 |

(51) Int. Cl.
    *F16C 33/58*    (2006.01)

(52) U.S. Cl. ..................................... 384/622; 384/615

(58) Field of Classification Search ................ 384/492, 384/569, 606, 615, 617–618, 622–623; 29/898.05, 29/898.052, 898.041; 148/212, 218, 228; 156/89.12; 428/216, 594, 901
    See application file for complete search history.

(56) References Cited

U.S. PATENT DOCUMENTS

| 3,981,549 | A | * | 9/1976 | Carullo ........................ 384/622 |
| 4,026,657 | A | * | 5/1977 | Chmura ....................... 403/122 |
| 4,042,309 | A | * | 8/1977 | Hiraga ......................... 417/269 |
| 4,285,422 | A | * | 8/1981 | Bentley .................... 192/105 B |
| 4,910,847 | A | * | 3/1990 | Christenson et al. ... 29/898.041 |
| 5,035,679 | A | * | 7/1991 | Green et al. ................. 474/135 |
| 5,474,390 | A | * | 12/1995 | Rhoads ........................ 384/623 |
| 5,545,095 | A | * | 8/1996 | Henderson ................... 474/135 |
| 5,584,585 | A | * | 12/1996 | Premiski et al. ............. 384/607 |
| 5,735,171 | A | * | 4/1998 | Moote et al. .................... 74/42 |
| 5,879,086 | A | * | 3/1999 | Muntnich et al. ........... 384/621 |
| 5,927,868 | A | * | 7/1999 | Critchley et al. ............ 384/606 |
| 5,938,349 | A | * | 8/1999 | Ogawa ........................ 384/617 |
| 5,975,763 | A | * | 11/1999 | Shattuck et al. ............. 384/622 |
| 6,102,580 | A | * | 8/2000 | Alling et al. ................. 384/618 |

(Continued)

FOREIGN PATENT DOCUMENTS

EP        0884859 A1 * 3/1999

(Continued)

OTHER PUBLICATIONS

Japanese Office Action, with English translation, issued in Japanese Patent Application No. 2005-014514, mailed Jun. 23, 2009.

(Continued)

*Primary Examiner*—Marcus Charles
(74) *Attorney, Agent, or Firm*—McDermott Will & Emery LLP

(57) ABSTRACT

Manufactured by quench hardening, a bearing washer for a thrust bearing inexpensive and excellent in durability is used without being subjected to grinding after quenching. In a bearing washer group including a plurality of bearing washers for the thrust bearing, when camber/waviness of each bearing washer constituting the bearing washer group that is randomly extracted is measured, a value obtained by adding a value three times as large as standard deviation of camber/waviness to an average value thereof is at most 40 μm.

15 Claims, 29 Drawing Sheets

U.S. PATENT DOCUMENTS

| | | | |
|---|---|---|---|
| 6,103,354 A * | 8/2000 | Araki et al. | 428/594 |
| 6,248,287 B1 * | 6/2001 | Hirakawa et al. | 266/249 |
| 6,290,208 B1 * | 9/2001 | Arnett | 251/185 |
| 6,502,332 B1 * | 1/2003 | Nakayama | 36/134 |
| 6,682,227 B2 * | 1/2004 | Grell et al. | 384/569 |
| 6,723,127 B2 * | 4/2004 | Ralph et al. | 623/17.13 |
| 6,752,535 B2 * | 6/2004 | Krochak | 384/623 |
| 6,790,294 B1 * | 9/2004 | Ishida et al. | 148/212 |
| 2004/0256029 A1 * | 12/2004 | Takayama et al. | 148/218 |

FOREIGN PATENT DOCUMENTS

| | | |
|---|---|---|
| JP | 53086411 A * | 7/1978 |
| JP | 04069180 A * | 3/1992 |
| JP | 6-73451 | 10/1994 |
| JP | 07-325080 | 12/1995 |
| JP | 08-225851 | 3/1996 |
| JP | 08-104971 | 4/1996 |
| JP | 09-130067 | 5/1997 |
| JP | 09-256058 | 9/1997 |
| JP | 11-043717 | 2/1999 |
| JP | 11-193823 | 7/1999 |
| JP | 11-351246 | 12/1999 |
| JP | 2000205801 A * | 7/2000 |
| JP | 2001-288530 | 10/2001 |
| JP | 2002-070872 | 3/2002 |
| JP | 2002-242927 | 8/2002 |
| JP | 2002-349581 | 12/2002 |
| JP | 2003-64442 | 3/2003 |
| JP | 2003-156050 | 5/2003 |
| JP | 2004-190778 | 7/2004 |
| JP | 2004-197878 | 7/2004 |
| SU | 859118 B * | 9/1981 |

OTHER PUBLICATIONS

Japanese Office Action, with English translation, issued in Japanese Patent Application No. 2005-014573, mailed Jun. 23, 2009.

Japanese Office Action, with English translation, issued in Japanese Patent Application No. 2005-014576, mailed Jun. 23, 2009.

Japanese Office Action with English language translation, issued in JP 2005-014573, dated Dec. 22, 2009.

Japanese Office Action with English language translation, issued in JP 2005-014576, dated Dec. 22, 2009.

* cited by examiner

REVOLUTION

25 μm

25 μm

BEARING WASHER FOR THRUST BEARING AND THRUST BEARING

BACKGROUND OF THE INVENTION

1. Field of the Invention

The present invention relates to a bearing washer for a thrust bearing and to a thrust bearing, and more particularly to a bearing washer for a thrust bearing manufactured by quench hardening and used without being subjected to grinding after quench hardening and to a thrust bearing including the bearing washer.

2. Description of the Background Art

For example, a thrust needle roller bearing including a needle roller, a cage and a bearing washer is structured such that the needle roller and the bearing washer are in line contact. Therefore, the thrust needle roller bearing is advantageous in achieving high load carrying capacity and high rigidity even with a small projected area of the bearing. Accordingly, the thrust needle roller bearing is suitable as a bearing used under a severe condition such as under insufficient lubrication or high-speed revolution, and employed, for example, in a compressor for an air-conditioner for an automobile, an automatic transmission, a manual transmission, a continuously variable transmission, a transmission with an actuator, a brake-by-wire, a differential gear, a transfer, and an outboard motor.

For example, in a compressor for an air-conditioner for an automobile, oil that is used has low viscosity and an amount of oil has been reduced in order to improve compressor performance (cooling performance). The thrust bearing is used under such a severe condition as under insufficient lubrication. As such, if differential slip of the roller is great, failure at an early stage due to surface damage such as surface-originating flaking may occur, and curing of such a defect has been demanded.

Meanwhile, when the thrust bearing is employed in an automatic transmission, a manual transmission, a continuously variable transmission, a transmission with an actuator, and a differential gear, from a viewpoint of energy saving, oil of low viscosity may be used or conventional oil to which an additive has been added may be used. The oil of low viscosity or the additive-containing oil is poorer than normal oil in lubricating performance in the bearing. Therefore, from a viewpoint of preventing surface damage such as surface-originating flaking, improvement in a state-of-the-art thrust bearing in which differential slip of the roller is great has been demanded.

In addition, the thrust bearing employed in a compressor for an air-conditioner for an automobile, an automatic transmission, a manual transmission, a continuously variable transmission, a transmission with an actuator, a brake-by-wire, a differential gear, a transfer, an outboard motor, and the like tends to be used under high load and its size also tends to be made smaller. Therefore, improvement also from a viewpoint of internally originating flaking caused by ordinary load-dependent rolling fatigue has been desired.

In view of the above, a long-life bearing effective against failure at the early stage due to surface damage such as surface-originating flaking and also against internally originating flaking caused by ordinary load-dependent rolling fatigue has been demanded.

In order to meet such a demand, a thrust needle roller bearing achieving longer life by improving a shape or the like of a cage of the thrust needle roller bearing so that an amount of passage of a lubricant per a unit time is increased has been proposed (see Japanese Patent Laying-Open No. 2002-70872).

From a viewpoint of longer life, it is also possible that camber/waviness of the bearing washer for the thrust bearing may cause a problem. Namely, if camber/waviness of the bearing washer is great, such a phenomenon that solely a part of a rolling contact surface of the roller serving as a rolling element is pressed against the bearing washer at the time of operation of the bearing (partial contact) takes place. Such partial contact may cause disruption in an oil film between the bearing washer and the roller serving as the rolling element. If the oil film is disrupted, the roller and the bearing washer come in metal-to-metal contact, and a temperature at that portion is raised. As a result, surface damage or surface-originating flaking is caused, which leads to shorter life of the bearing. In addition, if partial contact should occur, a contact pressure between the roller and the bearing washer may exceed a level expected in terms of design in a partial contact portion. In such a case, internally originating flaking caused by rolling fatigue occurs at an early stage, which results in shorter life of the bearing.

If camber/waviness of the bearing washer for the thrust bearing is great, noise or vibration at the time of operation of the bearing becomes large, which is quite problematic in an environment where operation sound should be low.

In order to address this problem, a method of subjecting an annular element corresponding to the bearing washer to prescribed forming in the cooling step in quenching of the annular element while a structure of the annular element is still in an austenite state has been proposed (see Japanese Patent Laying-Open No. 8-225851). This method serves to suppress strain of the annular element after quenching.

Moreover, a method of subjecting a ring member corresponding to the bearing washer to corrective tempering at a prescribed ratio has been proposed. This method serves to improve dimension accuracy of the ring member after completion of heat treatment (see Japanese Patent Laying-Open No. 9-256058).

In addition, a method of heating a ring member that has been subjected to cold working, in a state secured in a die, has been proposed. The ring member is thus subjected to sizing, and stress imposed by working is eliminated. Consequently, deformation of the ring member caused in subsequent heat treatment is suppressed (see Japanese Patent Laying-Open No. 11-43717).

Recently, however, a product using a thrust bearing as a part, such as a compressor for an air-conditioner for an automobile, an automatic transmission, a manual transmission, a continuously variable transmission, a transmission with an actuator, a brake-by-wire, a differential gear, a transfer, and an outboard motor has increasingly been sophisticated. Accordingly, further sophistication and higher precision such as longer life has been demanded in the thrust bearing that is used. In addition, in order to enhance cost-competitiveness of the product, an inexpensive thrust bearing has also been demanded.

Under such circumstances, durability of the thrust needle roller bearing disclosed in Japanese Patent Laying-Open No. 2002-70872 described above is insufficient, considering recent high demand on the thrust bearing. In addition, durability of the thrust bearing that achieves suppressed camber/waviness of the bearing washer with the manufacturing method disclosed in Japanese Patent Laying-Open Nos. 8-225851, 9-256058 and 11-43717 is also insufficient. Meanwhile, it runs counter to the demand for lower cost to improve durability with a method involving increased manufacturing cost or material cost.

SUMMARY OF THE INVENTION

From the foregoing, an object of the present invention is to provide a bearing washer for a thrust bearing and a thrust bearing inexpensive and excellent in durability.

A bearing washer group for a thrust bearing according to the present invention includes a plurality of bearing washers for a thrust bearing manufactured by quench hardening and used without being subjected to grinding after quench hardening. When camber/waviness of each bearing washer constituting the bearing washer group that is randomly extracted is measured, a value obtained by adding a value three times as large as standard deviation of camber/waviness to an average value thereof is at most 40 μm.

As described previously, greater camber/waviness of the bearing washer adversely affects an acoustic feature (noise or vibration) or the like of the thrust bearing. The present inventors have studied in detail relation between camber/waviness of the bearing washer and the acoustic feature of the thrust bearing. As a result of the study, the inventors have found the following. Specifically, it is not that the acoustic feature of the thrust bearing is deteriorated linearly with the greater camber/waviness of the bearing washer, but that the acoustic feature of the thrust bearing is deteriorated abruptly upon exceeding a critical value of camber/waviness, the critical value being in a range from 40 μm to 50 μm. Therefore, if the upper limit of camber/waviness of the bearing washer group can be set to at most 40 μm, the thrust bearing excellent in the acoustic feature can be obtained. In addition, if camber/waviness is smaller, a probability of occurrence of such a phenomenon as partial contact described previously can be lowered and therefore a life of the thrust bearing can be extended (durability can be enhanced). Namely, a thrust bearing excellent in durability in addition to the acoustic feature can constantly be manufactured.

Generally, in statistical quality control, a value obtained by adding a value three times as large as standard deviation to an average is handled as the virtual upper limit. Assuming that distribution of camber/waviness of the bearing washer for the thrust bearing is normal distribution, in the bearing washer group of which value obtained by adding a value three times as large as the standard deviation of camber/waviness of the bearing washer to an average value thereof is at most 40 μm, the bearing washer of which value of camber/waviness exceeds 40 μm accounts for 0.13% in the entire bearing washer group, and it can be considered that the virtual upper limit is 40 μm. Therefore, according to the bearing washer group of the present invention, the virtual upper limit of camber/waviness of the bearing washer constituting the bearing washer group is set to 40 μm, so that the bearing washer group capable of implementing a thrust bearing excellent in the acoustic feature can be obtained in a stable manner. In addition, the bearing washer group capable of implementing a thrust bearing excellent in durability can also be obtained by making smaller camber/waviness of the bearing washer as described above.

Moreover, in order to obtain the bearing washer group capable of implementing a thrust bearing excellent in the acoustic feature in a stable manner, when camber/waviness of each bearing washer constituting the bearing washer group that is randomly extracted is measured, a value obtained by adding a value three times as large as the standard deviation of camber/waviness to an average value thereof is preferably set to at most 30 μm. Here, as camber/waviness of the bearing washer is further made smaller, durability of the thrust bearing employing that bearing washer can further be improved.

A bearing washer group for a thrust bearing according to the present invention includes a plurality of bearing washers for a thrust bearing manufactured by quench hardening and used without being subjected to grinding after quench hardening. When camber/waviness of each bearing washer constituting the bearing washer group that is randomly extracted is measured, a probability of detection of the bearing washer of which camber/waviness is equal to or larger than 40 μm is at most 0.1%. Namely, when camber/waviness of 1000 bearing washers that have randomly been extracted is measured, there is one or less bearing washer of which camber/waviness is equal to or larger than 40 μm.

As described above, if the virtual upper limit of camber/waviness can be set to at most 40 μm, the thrust bearing excellent in the acoustic feature can be manufactured in a stable manner.

Here, if a probability of detection of the bearing washer of which camber/waviness is equal to or larger than 40 μm is at most 0.1% when camber/waviness of each bearing washer constituting the bearing washer group that is randomly extracted is measured, it can be considered that the virtual upper limit of camber/waviness of the bearing washer is 40 μm. Therefore, according to the bearing washer group of the present invention, the virtual upper limit of camber/waviness of the bearing washer constituting the bearing washer group is set to 40 μm, so that the bearing washer group capable of implementing a thrust bearing excellent in the acoustic feature can be obtained in a stable manner. In addition, the thrust bearing excellent also in durability can also be obtained.

A bearing washer group for a thrust bearing according to the present invention includes a plurality of bearing washers for a thrust bearing manufactured by quench hardening and used without being subjected to grinding after quenching. When camber/waviness of each bearing washer constituting the bearing washer group and belonging to one lot in the manufacturing step, in particular, in the quenching step (treated in one quenching step) is measured, a probability of detection of the bearing washer of which camber/waviness is equal to or larger than 40 μm is at most 0.1%.

Accordingly, as described above, the bearing washer group capable of implementing a thrust bearing excellent in the acoustic feature can be obtained in a stable manner. In addition, the thrust bearing excellent also in durability can also be obtained.

The number of bearing washers constituting the bearing washer group may be set to 100, or preferably to 500 and more preferably to 1000.

In the bearing washer group for a thrust bearing, preferably, the bearing washer has a surface hardness of at least 653 HV and an internal hardness of at least 653 HV.

If the surface hardness of the bearing washer is lower than 653 HV, rolling fatigue life of the thrust bearing is shortened. On the other hand, if the surface hardness is set to at least 653 HV, shorter rolling fatigue life can be avoided. Moreover, the internal hardness in addition to the surface hardness is set to at least 653 HV, so that plastic deformation of the bearing washer is less likely than in the bearing washer in which solely the surface hardness is set to at least 653 HV. The rolling fatigue life is thus further improved. Here, the hardness refers to hardness of a portion of the surface of the bearing washer that comes in contact with the roller (a rolling contact portion of a rolling contact surface), while the internal hardness refers to hardness in a central portion in a cross-section perpendicular to the surface of the bearing washer that comes in contact with the roller (rolling contact surface).

In the bearing washer group for a thrust bearing, preferably, the bearing washer uses, as a material, a steel containing at least 0.4 mass % to at most 1.2 mass % carbon.

The upper limit of hardness when the steel is subjected to quench hardening depends on the content of carbon in the steel. In order to ensure hardness not smaller than 653 HV described previously, at least 0.4 mass % of carbon is necessary. Meanwhile, if an amount of carbon becomes larger, an amount of austenite that is retained without turning to martensite after quenching (retained austenite) is increased. A small amount of retained austenite has little influence. If an amount of carbon is not smaller than 1.2 mass %, however, an amount of retained austenite is increased and quench hardness is lowered. In addition, retained austenite turns to martensite as a result of secular change which causes dimensional change. If an amount of carbon is not smaller than 1.2 mass %, coarsening and aggregation of a carbide ($Fe_3C$; cementite) takes place, and toughness of the bearing washer is considerably deteriorated. Therefore, an amount of carbon is set to at least 0.4 mass % to at most 1.2 mass %, so that hardness, dimensional stability and toughness required in the bearing washer can be ensured.

In the bearing washer group for a thrust bearing, preferably, the bearing washer is implemented by a member obtained by press working a steel plate.

Accordingly, the bearing washer can be more inexpensive than a bearing washer employing a member formed by turning or the like.

A thrust bearing according to the present invention includes the bearing washer constituting the bearing washer group described above.

As the thrust bearing according to the present invention includes the high-precision, highly functional and inexpensive bearing washer, a high-precision, highly functional and inexpensive thrust bearing can be provided in a stable manner.

A bearing washer for a thrust bearing according to the present invention is manufactured by quench hardening and used without being subjected to grinding after quench hardening. An intergranular oxidation layer in a surface portion of the bearing washer has a thickness of at most 1 µm.

The present inventors have studied relation between the intergranular oxidation layer and durability of the thrust bearing in the following.

Generally, the bearing washer for the thrust bearing is manufactured by quench hardening using carburizing heat treatment, bright heat treatment or the like. In the grain boundary in the surface portion of the bearing washer, an alloy element in the steel such as Cr, Mn or the like reacts with oxygen present in an atmospheric gas, thereby forming an oxide. Accordingly, an amount of the alloy element in the steel is small in a layer from the top surface to a deepest portion of an area where the oxide is formed, in a direction of thickness of the bearing washer. Consequently, the intergranular oxidation layer in the surface portion of the bearing washer is less susceptible to quench hardening, and hardness after quenching may be lowered. Then, in the bearing washer for the thrust bearing used without being subjected to grinding after quench hardening, hardness (that is, strength) of the surface portion is lowered, and failure originating from the surface portion is more likely. In addition, as the oxide formed in the intergranular oxidation layer is considerably different in hardness from the structure of surrounding steel, cracking may occur from that oxide. For these reasons, the thrust bearing including the bearing washer having the intergranular oxidation layer formed in the surface portion is more susceptible to failure originating from the surface portion, and durability (life) may be poorer.

In the bearing washer for the thrust bearing used without being subjected to grinding after quench hardening, a distance from the surface of the bearing washer to an area where intergranular oxidation has not occurred (that is, a thickness of the intergranular oxidation layer) is normally set approximately to 2 µm to 10 µm. The present inventors, however, have found that durability of the thrust bearing is, significantly improved by sufficiently making smaller a thickness of the intergranular oxidation layer, specifically to at most 1 µm. Therefore, according to the present invention, a bearing washer for a thrust bearing capable of constituting a thrust bearing excellent in durability can be provided.

Durability of the thrust bearing is clearly improved by setting the thickness of the intergranular oxidation layer to at most 1 µm. In order to further improve durability, the thickness of the intergranular oxidation layer is preferably set to at most 0.5 µm.

In the bearing washer for a thrust bearing, preferably, the bearing washer has a surface hardness of at least 653 HV and an internal hardness of at least 653 HV.

If the surface hardness of the bearing washer is lower than 653 HV, rolling fatigue life of the thrust bearing is shortened. On the other hand, if the surface hardness is set to at least 653 HV, shorter rolling fatigue life can be avoided. Moreover, the internal hardness in addition to the surface hardness is set to at least 653 HV, so that plastic deformation of the bearing washer is less likely than in the bearing washer in which solely the surface hardness is set to at least 653 HV. The rolling fatigue life is thus improved.

In the bearing washer for a thrust bearing, preferably, the bearing washer uses, as a material, a steel containing at least 0.4 mass % to at most 1.2 mass % carbon.

The upper limit of hardness when the steel is subjected to quench hardening depends on the content of carbon in the steel. In order to ensure hardness not smaller than 653 HV described previously, at least 0.4 mass % of carbon is necessary. Meanwhile, if an amount of carbon becomes larger, an amount of austenite that is retained without turning to martensite after quenching (retained austenite) is increased. A small amount of retained austenite has little influence. If an amount of carbon is not smaller than 1.2 mass %, however, an amount of retained austenite is increased and quench hardness is lowered. In addition, retained austenite turns to martensite as a result of secular change, which causes dimensional change. If an amount of carbon is not smaller than 1.2 mass %, coarsening and aggregation of a carbide ($Fe_3C$; cementite) takes place, and toughness of the bearing washer is considerably deteriorated. Therefore, an amount of carbon is set to at least 0.4 mass % to at most 1.2 mass %, so that hardness, dimensional stability and toughness required in the bearing washer can be ensured.

In the bearing washer for a thrust bearing, preferably, the bearing washer is implemented by a member obtained by press working a steel plate.

Accordingly, the bearing washer can be more inexpensive than a bearing washer employing a member formed by turning or the like.

The thrust bearing according to the present invention includes the bearing washer described above. The thrust bearing according to the present invention includes the bearing washer inexpensive and excellent in durability. Therefore, a thrust bearing inexpensive and excellent in durability can be provided.

A bearing washer for a thrust bearing according to the present invention is manufactured by quench hardening and used without being subjected to grinding after quench hardening. When a cross-section perpendicular to a rolling contact surface of the bearing washer is mirror polished and immersed in an etchant (JIS G 0551 annex 1) obtained by adding a surfactant to a picric acid saturated aqueous solution so as to corrode the mirror polished surface and when a central portion in that cross-section is observed under magnification of 400× using an optical microscope, a region enclosed by grain boundary occupies at most 10% of the entire field of view. Here, the rolling contact surface of the bearing washer refers to a surface of the bearing washer for the thrust bearing that comes in contact with the rolling element. Prior austenite grain boundary refers to grain boundary formed when the structure of the steel in the bearing washer is austenitized in the quenching step, that is, refers to a boundary that appears as a result of corrosion in a preceding manner when the structure of the steel is corroded by the etchant. A measurement area used for measuring a ratio of presence of the region enclosed by the grain boundary after the mirror polished surface is corroded as described above may be shaped like a rectangle having an actual size of 225 μm×175 μm. Here, the region enclosed by the grain boundary may occupy at most 10% and more preferably at most 5% of the whole measurement area.

The present inventors have studied relation between prior austenite grain -.boundary and durability of the thrust bearing in the following.

Generally, the bearing washer for the thrust bearing is manufactured by quench hardening using carburizing heat treatment, bright heat treatment or the like. Here, initially, the bearing washer is heated to a temperature not lower than $A_{c1}$ point, so that the structure of the steel is austenitized and the grain boundary is formed. Here, there are a larger number of lattice defects in the grain boundary than within the grain. In addition, there is a larger amount of impurity element in the steel at the grain boundary than within the grain. Thereafter, the bearing washer is rapidly cooled to a temperature not higher than $M_S$ point, and the structure of the steel turns to martensite. On the other hand, a site that used to be the grain boundary when the structure of the steel was in an austenite state still has a characteristic different from surrounding structure even after the structure turned to martensite, because it previously served as austenite grain boundary (prior austenite grain boundary). The prior austenite grain boundary is more susceptible to corrosion than the surrounding structure. Therefore, presence of prior austenite grain boundary can be determined by corroding the quenched structure.

As described above, the prior austenite grain boundary is present in the quenched structure, and has a characteristic different from the surrounding structure. Therefore, the prior austenite grain boundary may foster occurrence or development of cracking in the bearing washer for the thrust bearing and may lower durability of the thrust bearing.

To address this problem, the present inventors have found that durability of the thrust bearing is significantly improved by not allowing sufficient progress of formation of the prior austenite grain boundary, specifically by permitting the region enclosed by grain boundary to occupy at most 10% of the entire field of view (alternatively, by permitting a region enclosed by grain boundary to occupy at most 10% of a measurement area in a rectangular shape having an actual size of 225 μm×175 μm) when a cross-section perpendicular to the rolling contact surface of the bearing washer is mirror polished and immersed in an etchant obtained by adding a surfactant to a picric acid saturated aqueous solution so as to corrode the mirror polished surface and when the central portion in that cross-section is observed under magnification of 400× using an optical microscope. Therefore, according to the present invention, a bearing washer for a thrust bearing capable of constituting a thrust bearing excellent in durability can be provided.

Durability of the thrust bearing is clearly improved by permitting the region enclosed by grain boundary to occupy at most 10% of the entire field of view. In order to further improve durability, however, it is preferable to permit that region to occupy at most 5% of the entire field of view.

In the bearing washer for a thrust bearing, preferably, the bearing washer has a surface hardness of at least 653 HV and an internal hardness of at least 653 HV.

If the surface hardness of the bearing washer is lower than 653 HV, rolling fatigue life of the thrust bearing is shortened. On the other hand, if the surface hardness is set to at least 653 HV, shorter rolling fatigue life can be avoided. Moreover, the internal hardness in addition to the surface hardness is set to at least 653 HV, so that plastic deformation of the bearing washer is less likely than in the bearing washer in which solely the surface hardness is set to at least 653 HV. The rolling fatigue life is thus improved.

In the bearing washer for a thrust bearing, preferably, the bearing washer uses, as a material, a steel containing at least 0.4 mass % to at most 1.2 mass % carbon.

The upper limit of hardness when the steel is subjected to quench hardening depends on the content of carbon in the steel. In order to ensure hardness not smaller than 653 HV described previously, at least 0.4 mass % of carbon is necessary. Meanwhile, if an amount of carbon becomes larger, an amount of austenite that is retained without turning to martensite after quenching (retained austenite) is increased. A small amount of retained austenite has little influence. If an amount of carbon is not smaller than 1.2 mass %, however, an amount of retained austenite is increased and quench hardness is lowered. In addition, retained austenite turns to martensite as a result of secular change, which causes dimensional change. If an amount of carbon is not smaller than 1.2 mass %, coarsening and aggregation of a carbide ($Fe_3C$; cementite) takes place, and toughness of the bearing washer is considerably deteriorated. Therefore, an amount of carbon is set to at least 0.4 mass % to at most 1.2 mass %, so that hardness, dimensional stability and toughness required in the bearing washer can be ensured.

In the bearing washer for a thrust bearing, preferably, the bearing washer is implemented by a member obtained by press working a steel plate.

Accordingly, the bearing washer can be more inexpensive than a bearing washer employing a member formed by turning or the like.

The thrust bearing according to the present invention includes the bearing washer described above. The thrust bearing according to the present invention includes the bearing washer inexpensive and excellent in durability. Therefore, a thrust bearing inexpensive and excellent in durability can be provided.

As can clearly be seen from the description above, according to the bearing washer for the thrust bearing and the thrust bearing of the present invention, a bearing washer for a thrust bearing and a thrust bearing inexpensive and excellent in durability can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
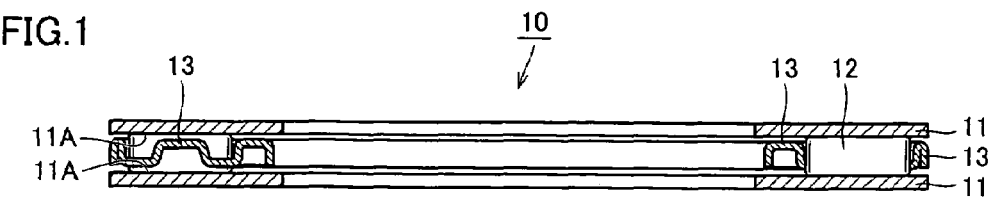
FIGS. 1 to 5 are schematic cross-sectional views showing a thrust bearing according to Embodiment 1.
Figure 2:
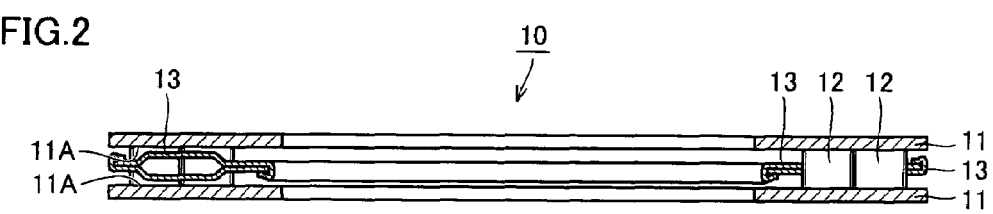
Figure 3:
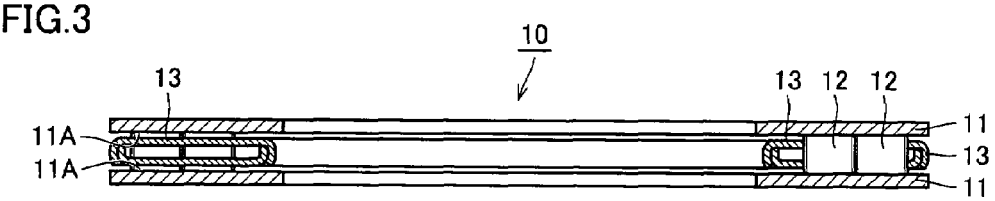

An embodiment of the present invention will be described hereinafter with reference to the drawings. As the same or corresponding elements have the same reference characters allotted, detailed description thereof will not be repeated.

Embodiment 1

Figure 6:
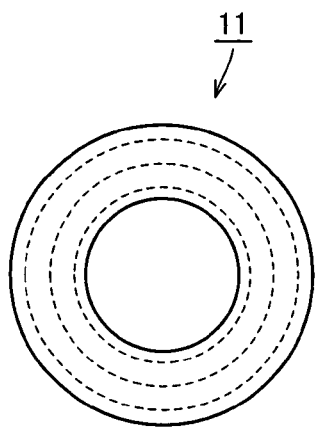
FIG. 6 is a schematic plan view showing a site where camber/waviness of a bearing washer for the thrust bearing according to. Embodiment 1 is measured.
Figure 7:
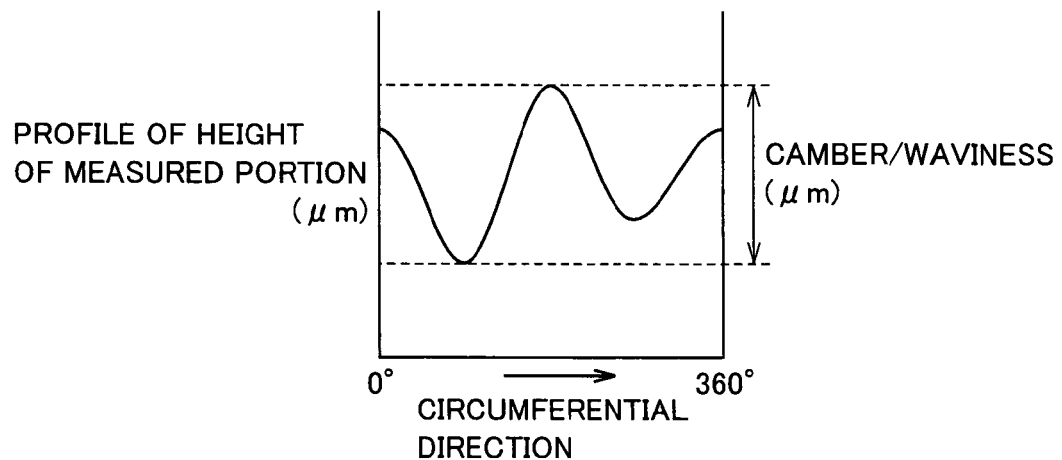
FIG. 7 shows one example of a profile obtained by measuring camber/waviness.

Referring to FIGS. 1, 6 and 7, a structure of a thrust bearing according to Embodiment 1 of the present invention will be described.

Referring to FIG. 1, a thrust bearing 10 includes, for example, a pair of bearing washers 11, 11, a plurality of rolling elements 12, and an annular cage 13. Rolling element 12 is arranged between the pair of bearing washers 11, 11 so as to be in contact with rolling contact surfaces 11A, 11A of bearing washers 11, 11. In addition, rolling element 12 is arranged in a circumferential direction at prescribed pitches and held by cage 13 in a freely rolling manner. In this manner, bearing washers 11, 11 can revolve relative to each other.

Referring to FIG. 6, as shown with a dashed line, camber/waviness is measured at a position distant from an inner circumference by 1 mm, at a position distant from an outer circumference by 1 mm, and at a position therebetween. Referring to FIG. 7, a difference between the highest point and the lowest point is read from a profile of height obtained as a result of measurement, and the difference serves as a value for camber/waviness. When camber/waviness of a plurality of bearing washers 11 (bearing washer group) included in thrust bearing 10 according to Embodiment 1 is measured, a value obtained by adding a value three times as large as standard deviation of camber/waviness to an average value thereof is at most 40 μm.

A method of manufacturing bearing washer 11 and thrust bearing 10 in Embodiment 1 will now be described.

Figure 8:
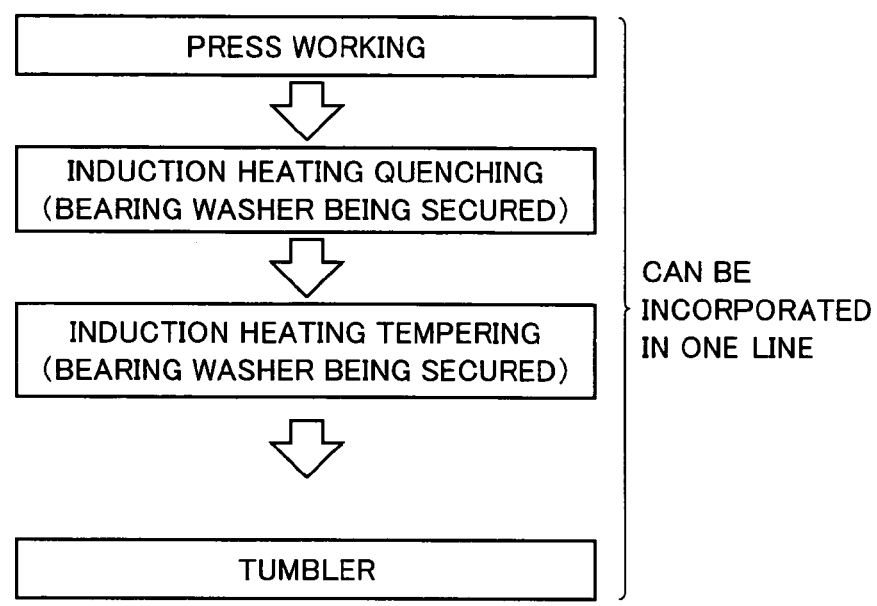
FIG. 8 shows one example of the step of manufacturing the bearing washer according to Embodiment 1.

Referring now to FIG. 8, one example of the step of manufacturing bearing washer 11 of Embodiment 1 will be described.

Initially, for example, S55C, SAE1070, SK5, and SUJ2 can be selected as a material for bearing washer 11 in Embodiment 1. These materials are steels containing at least 0.4 mass % to at most 1.2 mass % carbon. For example, a steel plate made from these materials is used as a raw material to form bearing washer 11 by press working. Then, bearing washer 11 is implemented by a member obtained by press working and forming the steel plate. Thereafter, while bearing washer 11 is secured in order to suppress camber/waviness of bearing washer 11, bearing washer 11 is subjected to quenching and tempering using induction heating. In this manner, camber/waviness is suppressed and the surface hardness and the internal hardness of bearing washer 11 are both set to at least 653 HV. Then, for example, a tumbler is used for finishing, without using grinding.

According to these steps, facilities for induction heating are of a relatively small scale and a carburizing gas that should be handled with care is not used. Therefore, combined with the working process, one line can be realized (incorporated in one line). As there is no work-in-process before and after heat treatment, reduction in manufacturing cost is achieved. In addition, as control of the product is facilitated, piece-by-piece quality control can be realized. Higher quality of the product is thus achieved.

Moreover, in ordinary steps, camber/waviness is great at the time of completion of tempering of the bearing washer. Accordingly, in many cases, the step of press tempering for correction is performed. In contrast, in the present step, as securing for suppressing camber/waviness of the bearing washer is carried out in the step of quenching and tempering, camber/waviness of bearing washer 11 is small at the time of completion of tempering. Therefore, the step of press tempering is not necessary, and high precision bearing washer 11 can be manufactured with low cost.

Figure 9:
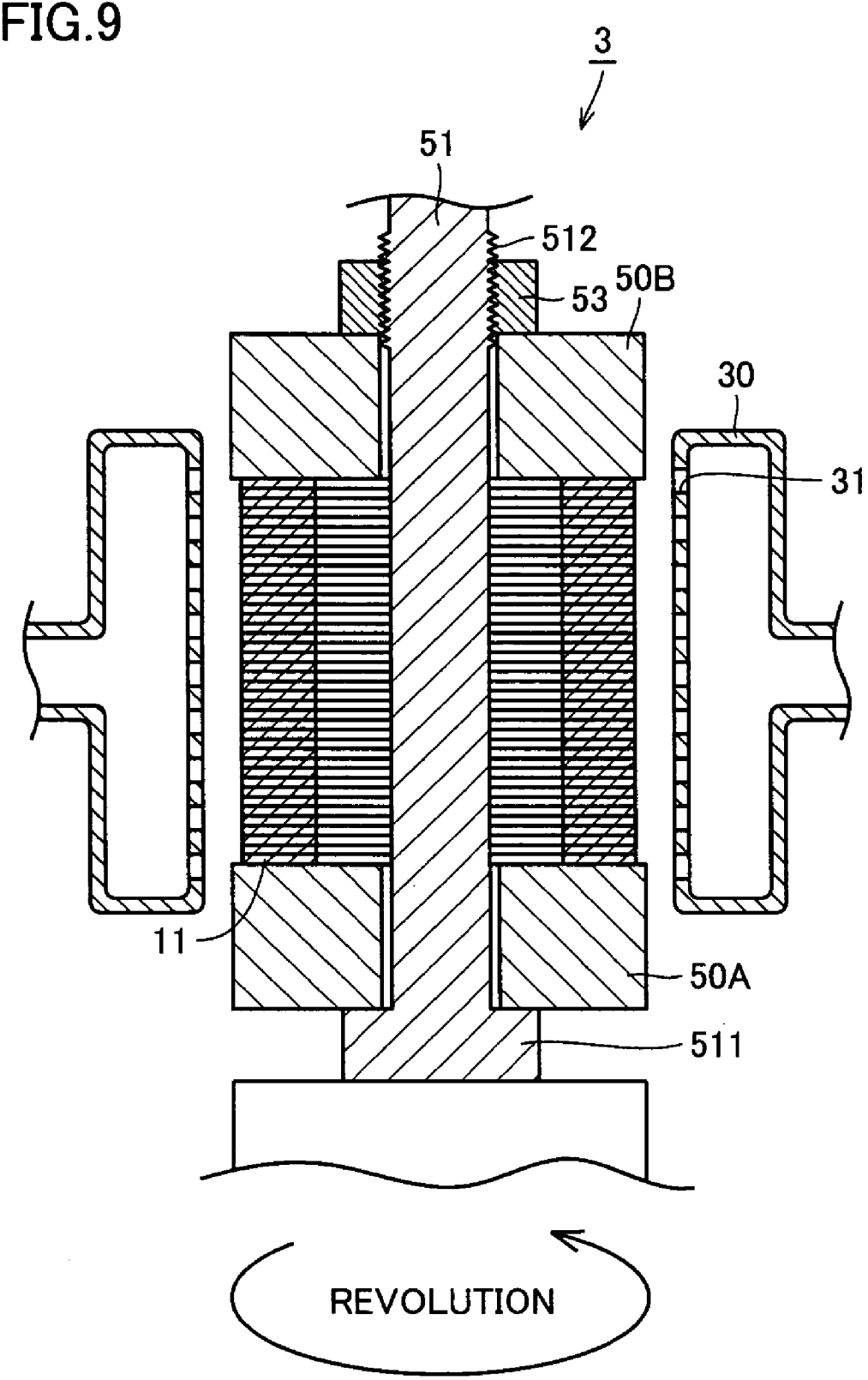
FIG. 9 shows one example of an induction heat treatment apparatus used in the step of manufacturing the bearing washer according to Embodiment 1.

Quenching and tempering in the manufacturing method of bearing washer 11 in Embodiment 1 will now be described in detail. Referring to FIG. 9, one example of a method of heat treatment of bearing washer 11 in Embodiment 1 will be described in detail.

Referring to FIG. 9, an induction heat treatment apparatus 3 includes an induction coil 30, a lower portion securing jig 50A, an upper portion securing jig 50B, a central shaft 51, and a jig-retaining nut 53. Induction coil 30 has a cooling water discharge port 31 for discharging cooling water. Central shaft 51 has a swelled portion 511 at its lower end and has a threaded portion 512 in its upper portion. Jig-retaining nut 53 is internally threaded.

In the following, a procedure for heat treatment will be described with reference to FIG. 9.

Central shaft 51 is inserted in lower portion securing jig 50A. Lower portion securing jig 50A is arranged so as to be in contact with swelled portion 511 at the lower end of the central shaft. Central shaft 51 is inserted in bearing washer 11 for the thrust bearing having a hole in its center. Bearing washer 11 is arranged so as to be in contact with a flat upper surface of lower portion securing jig 50A. Though a single bearing washer 11 may be provided, a plurality of bearing washers 11 are preferably provided, from a viewpoint of higher efficiency in heat treatment. When a plurality of bearing washers are simultaneously subjected to heat treatment, bearing washers 11 are stacked in a manner remaining in a heating range where heat from induction coil 30 arranged on opposing sides of central shaft 51 can be received. Upper portion securing jig 50B is arranged such that its flat lower surface is in contact with the upper portion of bearing washer 11. Central shaft 51 is inserted in upper portion securing jig 50B. Jig-retaining nut 53 is fitted to central shaft 51 such that its internal thread is engaged with threaded portion 512 of central shaft 51 and tightened with prescribed torque. In this manner, in bearing washer 11, stress in a direction pressing rolling contact surface 11A is applied to the entire rolling contact portion.

When a high-frequency current is fed to induction coil 30, bearing washer 11 is induction-heated. Bearing washer 11 is heated to a temperature not lower than $A_{c1}$ point and held for a prescribed period (heating step). Thereafter, current feed is stopped, and cooling water is sprayed to bearing washer 11 through cooling water discharge port 31 of induction coil 30. Bearing washer 11 is thus rapidly cooled to a temperature not higher than $M_S$ point (cooling step). Through the procedure above, bearing washer 11 is subjected to quench hardening, with the stress in a direction pressing the rolling contact surface being applied. Here, in order to achieve uniform heating and cooling, preferably, a portion other than induction coil 30 in induction heat treatment apparatus 3 is revolved relative to induction coil 30 around central shaft 51, as shown with an arrow.

Here, $A_{c1}$ point refers to a point at which steel starts to transform from ferrite to austenite when the steel is continuously heated. Meanwhile, $M_S$ point refers to a point at which the austenitized steel starts to turn to martensite when cooled.

In addition, the rolling contact surface of the bearing washer refers to a surface of the bearing washer on the side where the rolling element rolls. The rolling contact portion of the bearing washer refers to a portion of the rolling contact surface where the rolling element rolls.

A high-frequency current is again fed to induction coil 30, and bearing washer 11 is heated to a temperature not higher than $A_{c1}$ point. After bearing washer 11 is held at a prescribed temperature for a prescribed period, heating is stopped and bearing washer 11 is cooled (tempering step). Through the procedure above, bearing washer 11 is tempered, with the stress in a direction pressing the rolling contact surface being applied. Here, in order to achieve uniform heating, preferably, the portion other than induction coil 30 in induction heat treatment apparatus 3 is revolved relative to induction coil 30 around central shaft 51, as shown with an arrow.

Through the steps above, bearing washer 11 is quenched and tempered, with the stress in a direction pressing rolling contact surface 11A being applied at least to the entire rolling contact portion of bearing washer 11.

Application of stress does not necessarily have to be continuous and may be stopped as required. From a viewpoint of suppression of deformation and fewer steps, however, desirably, bearing washer 11 is secured before heat treatment and continues to be in the secured state until the heat treatment ends. Though bearing washer 11 may be subjected to heat treatment one-by-one, in order to further reduce manufacturing cost of bearing washer 11, desirably, a plurality of bearing washers are simultaneously subjected to heat treatment.

According to this heat treatment method, camber/waviness of bearing washer 11 is suppressed, and a value obtained by adding a value three times as large as standard deviation of camber/waviness of the bearing washer group constituted of a plurality of bearing washers 11 to an average value thereof can be at most 40 μm when the heat treatment ends.

According to the manufacturing method described above, bearing washer 11 for thrust bearing 10 implemented by a member obtained by press working a steel plate, in which a value obtained by adding a value three times as large as standard deviation of camber/waviness to an average value thereof is set to at most 40 μm, the surface hardness and the internal hardness are set to at least 653 HV, and a steel containing at least 0.4 mass % to at most 1.2 mass % carbon is used as a material, can be manufactured. In addition, thrust bearing 10 including bearing washer 11 structured as above can be manufactured by using bearing washer 11.

Figure 4:
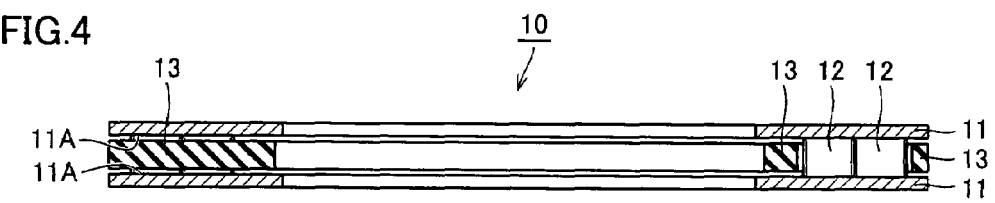
Figure 5:
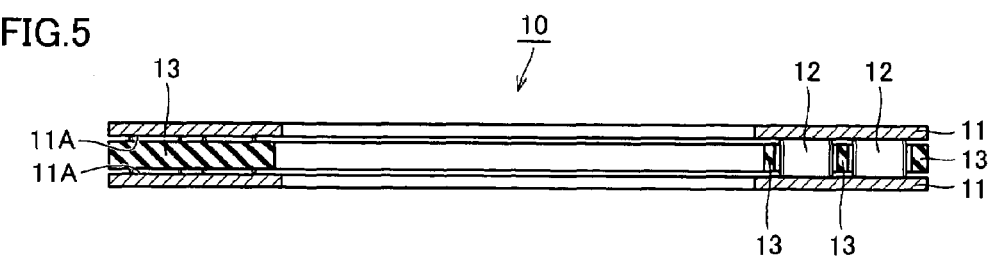

Though thrust bearing 10 in which rolling elements 12 are arranged in a single row has been described with reference to FIG. 1, rolling elements 12 may be arranged in multiple rows, as shown in FIGS. 2 to 5. In addition, the shape of cage 13 is not limited to that shown in FIG. 1, and the cage may be in a shape as shown in FIGS. 2 to 5, for example. Moreover, though cage 13 is made of metal in FIGS. 1 to 3, a material for cage 13 is not limited to metal and a resin may be employed, for example, as shown in FIGS. 4 and 5. If multiple-row rolling elements 12 are included, the rolling elements adjacent in a radial direction are held in a single holding area provided in the cage in FIGS. 2 to 4, however, the holding area may be divided so that rolling elements 12 are held in the plurality of holding areas, as shown in FIG. 5.

Though heat treatment using induction heat treatment apparatus 3 shown in FIG. 9 has been discussed in the method of manufacturing the thrust bearing described above, other heat treatment method representing a variation of the heat treatment method above may be selected.

Heat treatment using an induction heat treatment apparatus according to a first variation will be described with reference to FIG. 10.

Figure 10:
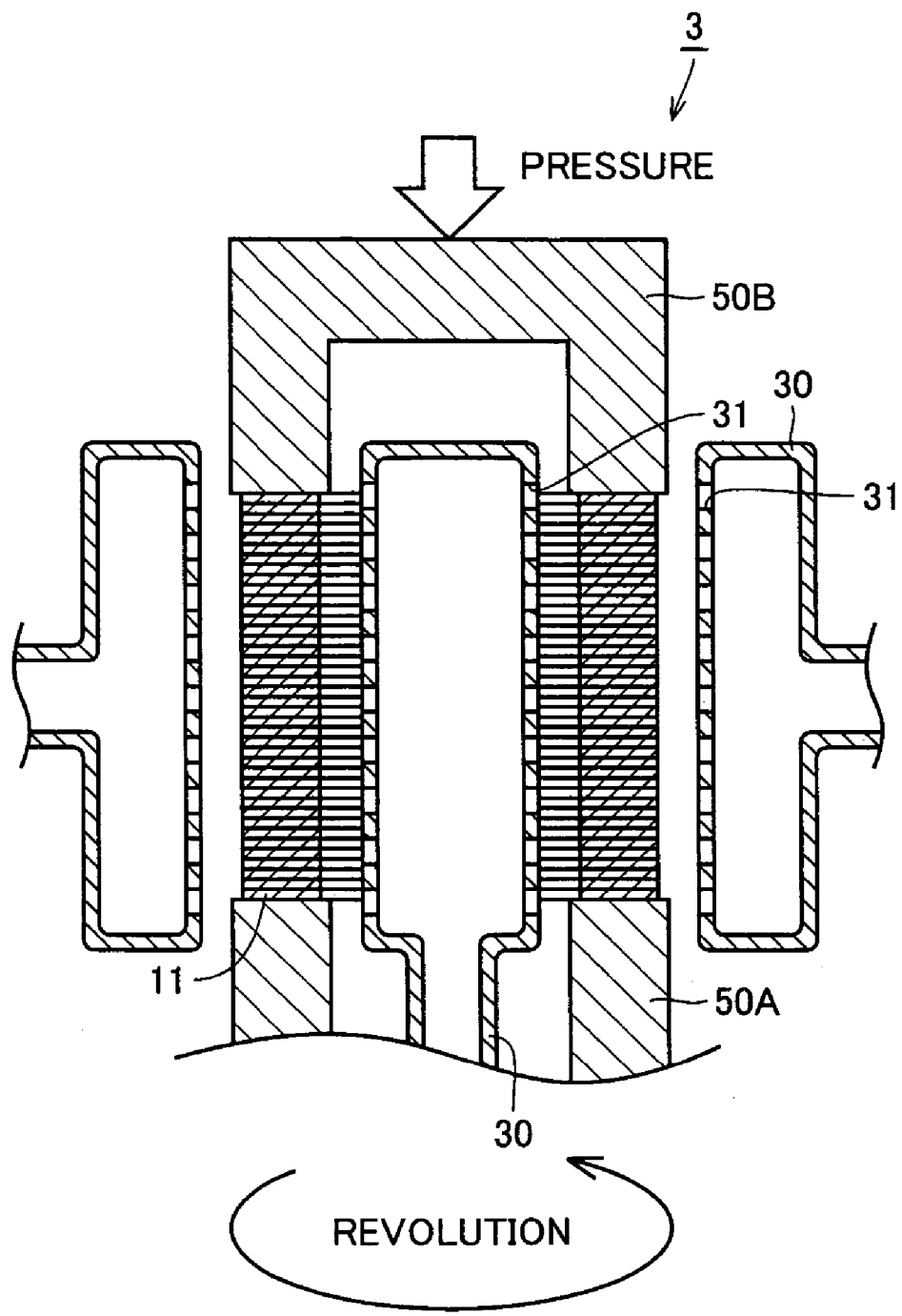
FIG. 10 is a schematic cross-sectional view showing a first variation of the induction heat treatment apparatus used in the step of manufacturing the bearing washer according to Embodiment 1.

Referring to FIG. 10, induction heat treatment apparatus 3 according to the first variation and induction heat treatment apparatus 3 in FIG. 9 described above are structured basically in a similar manner. Induction heat treatment apparatus 3 according to the first variation is different from induction heat treatment apparatus 3 in FIG. 9 in that central shaft 51 and jig-retaining nut 53 engaged therewith are not included and that induction coil 30 is arranged on an inner circumferential side of bearing washer 11.

In the following, a procedure for heat treatment will be described with reference to FIG. 10.

The procedure for heat treatment is basically the same as in FIG. 9. Unlike the case in FIG. 9, however, it is not that upper portion securing jig 50B is pressed against bearing washer 11 by being tightened by jig-retaining nut 53 but that pressure is applied thereto by other means (such as a hydraulic cylinder). Accordingly, the stress in a direction pressing the rolling contact surface is applied at least to the entire rolling contact portion of bearing washer 11. In addition, heating for quenching and tempering is carried out not only from the outer circumferential side of bearing washer 11 but also from the inner circumferential side thereof According to the first variation, as compared with Embodiment 1, bearing washer 11 is heated more uniformly. Therefore, the first variation is advantageous in suppressing camber/waviness.

Heat treatment using an induction heat treatment apparatus according to a second variation will be described with reference to FIG. 11.

Figure 11:
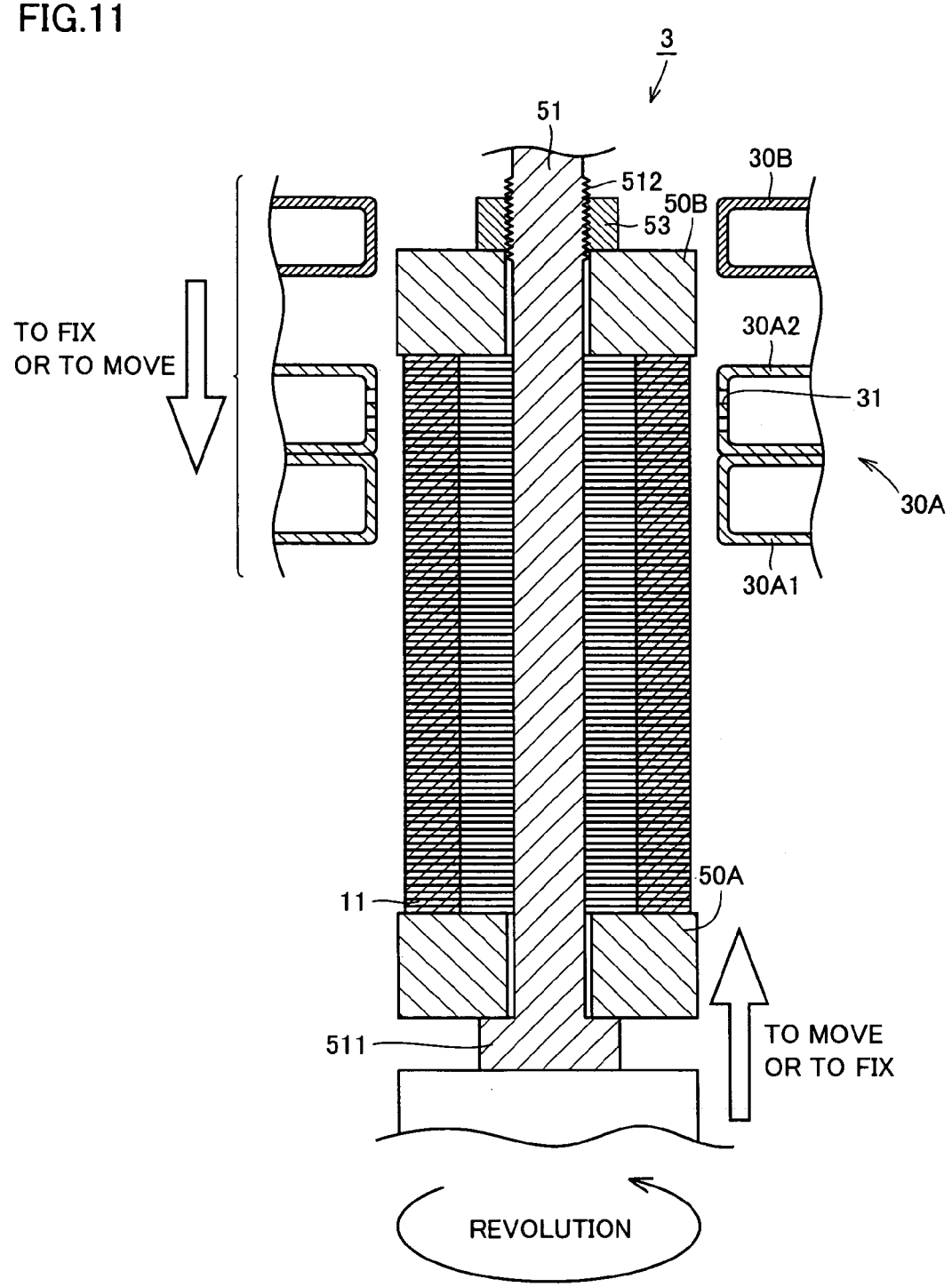
FIG. 11 is a schematic cross-sectional view showing a second variation of the induction heat treatment apparatus used in the step of manufacturing the bearing washer according to Embodiment 1.

Referring to FIG. 11, induction heat treatment apparatus 3 according to the second variation and induction heat treatment apparatus 3 in FIG. 9 described above are structured basically in a similar manner. Induction heat treatment apparatus 3 according to the second variation is different from induction heat treatment apparatus 3 in FIG. 9.in that, instead of induction coil 30, an induction coil for quenching 30A and an induction coil for tempering 30B are arranged on opposing sides of central shaft 51. In addition, induction coil for quenching 30A is implemented by a first induction coil for quenching 30A1 and a second induction coil for quenching 30A2 adjacent to first induction coil for quenching 30A1 arranged between first induction coil for quenching 30A1 and induction coil for tempering 30B. Second induction coil for quenching 30A2 has cooling water discharge port 31. Induction heat treatment apparatus 3 in FIG. 9 is structured such that all bearing washers 11 that have been arranged can simultaneously be heated. On the other hand, the second variation is structured such that solely some of bearing washers 11 can be heated. Specifically, the height of induction coils 30A, 30B is smaller than the height of the plurality of bearing washers 11 that have been set, so that induction coils 30A, 30B can face end surfaces of solely some of bearing washers 11. Furthermore, according to the second variation, one or both of induction coils 30A, 30B and central shaft 51 can move in an axial direction of central shaft 51, so that central shaft 51 can move relative to induction coils 30A, 30B.

In the following, a procedure for heat treatment will be described with reference to FIG. 11.

Lower portion securing jig 50A, upper portion securing jig 50B, bearing washer 11, and jig-retaining nut 53 are arranged in a manner similar to FIG. 9, and the stress in a direction pressing the rolling contact surface of bearing washer 11 is applied at least to the entire rolling contact portion of bearing washer 11.

Then, a high-frequency current is fed to induction coils 30A and 30B, and central shaft 51 moves relative to induction coils 30A and 30B. Accordingly, bearing washer 11 reaches a position lying between first induction coil for quenching 30A1 to which a current is fed. Bearing washer 11 is thus induction-heated to a temperature not lower than $A_{c1}$ point. Then, heated bearing washer 11 moves relative to first induction coil for quenching 30A1, and reaches a position lying between second induction coil for quenching 30A2 and maintained at the temperature not lower than $A_{c1}$ point for a prescribed period. Thereafter, heating of bearing washer 11 by second induction coil for quenching 30A2 is stopped, and cooling water is sprayed to bearing washer 11 from cooling water discharge port 31, to rapidly cool bearing washer 11 to a temperature not higher than $M_S$ point. Through the procedure above, quenching is performed, with the stress in a direction pressing rolling contact surface 11A being applied to bearing washer 11.

Bearing washer 11 further moves relative to induction coils 30A, 30B, and reaches a position lying between induction coil for tempering 30B. Accordingly, bearing washer 11 is heated to a prescribed tempering temperature not higher than $A_{c1}$ point. Then, heated bearing washer 11 moves relative to induction coil for tempering 30B and it is air-cooled as a result of moving out of a heating range after a prescribed period elapses. Tempering is thus performed, with the stress in a direction pressing the rolling contact surface being applied to bearing washer 11.

Through the steps above, bearing washer 11 is quenched and tempered, with the stress in a direction pressing the rolling contact surface being applied at least to the entire rolling contact portion of the bearing washer.

According to the second variation, even when bearing washers 11 are stacked beyond a length of induction coils 30A, 30B, bearing washer 11 can be subjected to heat treatment.

Embodiment 2

Thrust bearing 10 according to Embodiment 2 and thrust bearing 10 according to Embodiment 1 described in connection with FIGS. 1 to 7 are structured basically in a similar manner. In Embodiment 1, a value obtained by adding a value three times as large as standard deviation of camber/waviness of the bearing washer group constituted of bearing washers 11 included in thrust bearing 10 to an average value thereof is at most 40 μm. On the other hand, in Embodiment 2, when camber/waviness of each bearing washer 11 constituting the bearing washer group that is randomly extracted is measured, a probability of detection of bearing washer 11 of which camber/waviness is equal to or larger than 40 μm is at most 0.1%.

Though camber/waviness of bearing washer 11 may be measured with the method explained with reference to FIGS. 6 and 7 in Embodiment 1 as described above, other measurement method may be employed in Embodiment 2.

A screening apparatus and a screening method used in a variation of the method of measuring camber/waviness will now be described with reference to FIG. 12.

Figure 12:
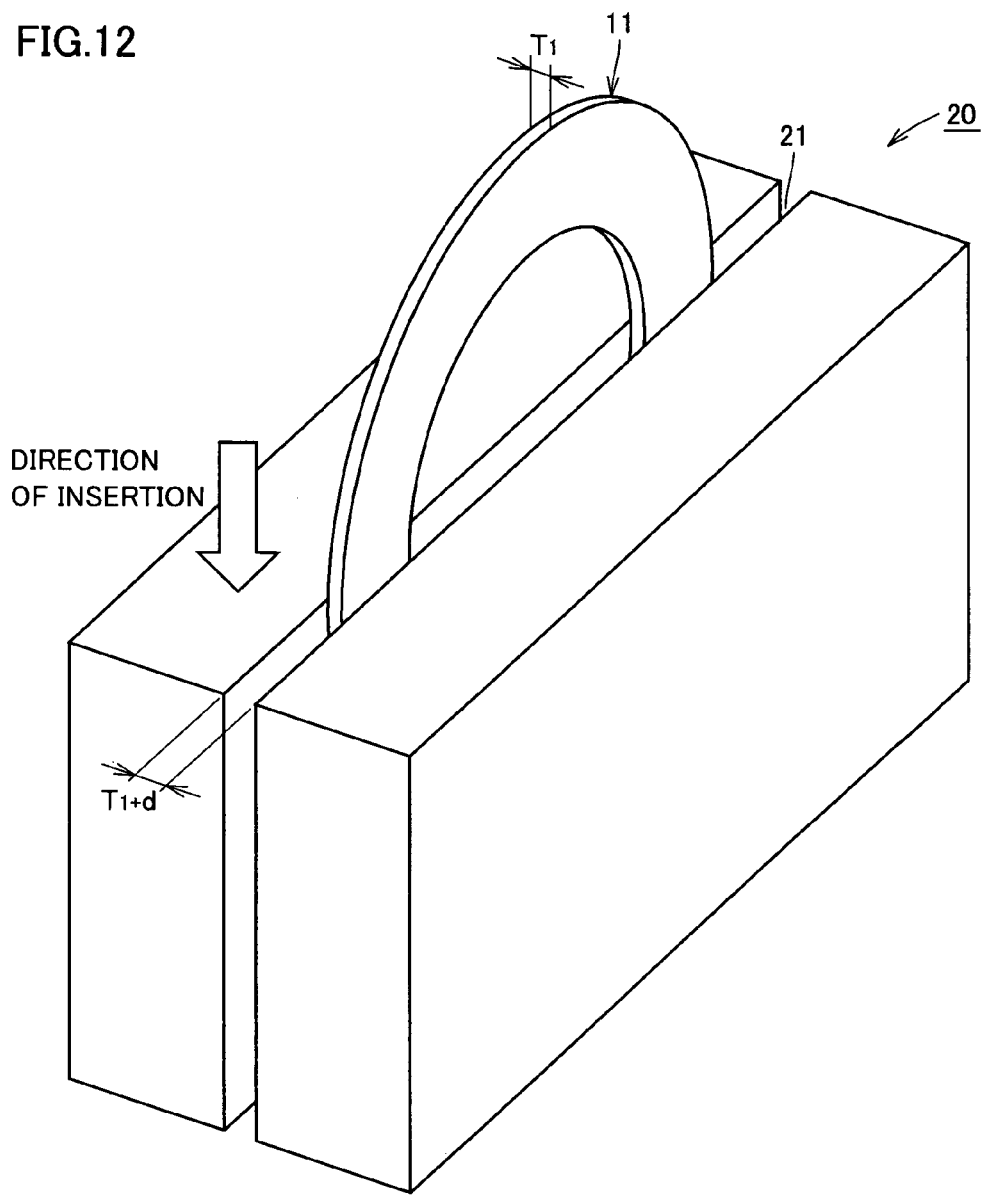
FIG. 12 is a perspective view showing a variation of a method of measuring camber/waviness of the bearing washer applicable to Embodiment 2.

Referring to FIG. 12, a slit gauge 20 has a slit 21 having a width of $T_1+d$. Here, $T_1$ represents a thickness of bearing washer 11, and d represents the upper limit of camber/waviness.

Here, bearing washer 11 is inserted in slit 21. If camber/waviness of bearing washer 11 is not larger than d, bearing washer 11 can pass through. On the other hand, camber/waviness of bearing washer 11 exceeds d, bearing washer 11 cannot pass through. Here, if d is set to 40 μm, bearing washer 11 having camber/waviness not smaller than 40 μm can be screened. When the bearing washer group constituted of bearing washers 11 according to Embodiment 2 is thus screened, a probability of detection of the bearing washer of which camber/waviness is equal to or larger than 40 μm is at most 0.1%.

The manufacturing method according to the present embodiment is similar to the method described with reference to FIGS. 8 and 9 in Embodiment 1, and the heat treatment method according to the first or second variation may be selected.

Embodiment 3

Referring to FIGS. 13 to 23, an example of a structure of a thrust bearing according to Embodiment 3 of the present invention will be described.

In Embodiments 1 and 2 above, it has been described that thrust bearing 10 includes a pair of bearing washers 11, 11, a plurality of rolling elements 12 and annular cage 13, and that bearing washer 11 has a flat plate shape. Embodiment 3 is similar to Embodiments 1 and 2 in that thrust bearing 10 includes, for example, a pair of bearing washers 11, 11, rolling element 12 and cage 13. On the other hand, Embodiment 3 is different from Embodiments 1 and 2 in that one bearing washer 11 has an inner flange 111 extending in a direction intersecting rolling contact surface 11A on a side radially inward, while the other bearing washer 11 has an outer flange 113 extending in a direction intersecting rolling contact surface 11A on a side radially outward. In addition, Embodiment 3 is different from Embodiments 1 and 2 also in that an inner flange projection portion 112 projecting radially outward is formed at a tip end portion of inner flange 111, and an outer flange projection portion 114 projecting radially inward is formed at a tip end portion of outer flange 113. Accordingly, bearing washer 11 is not separated from cage 13 and rolling element 12 held by cage 13, as a result of an action of inner flange projection portion 112 and outer flange projection portion 114.

Figure 13:
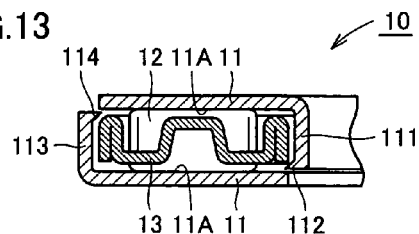
FIGS. 13 to 23 are schematic partial cross-sectional views showing examples of a structure around a rolling element of a thrust bearing according to Embodiment 3.
Figure 19:
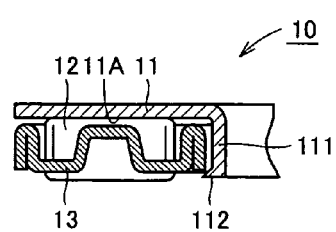
Figure 14:
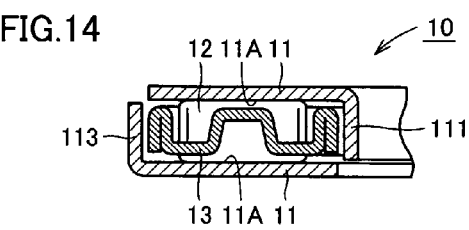
Figure 20:
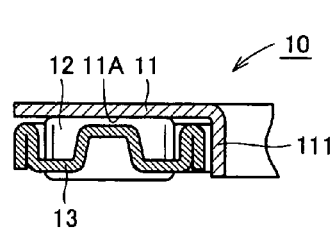
Figure 15:
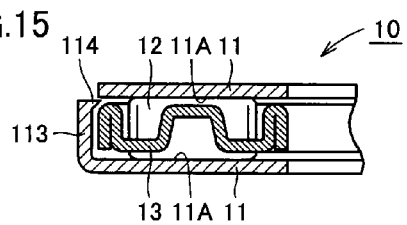
Figure 21:
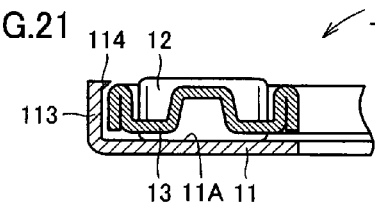
Figure 16:
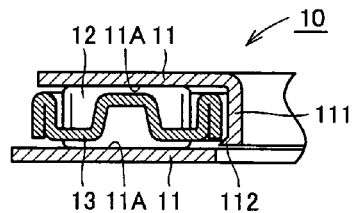
Figure 22:
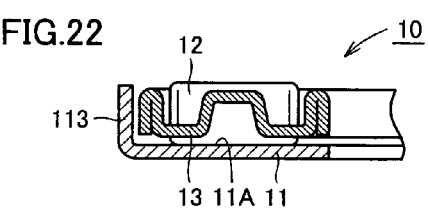
Figure 17:
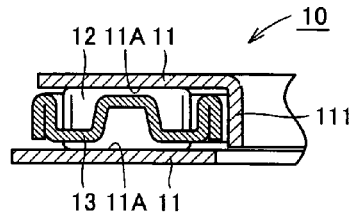
Figure 23:
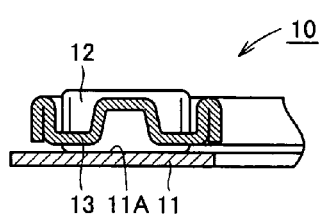
Figure 18:
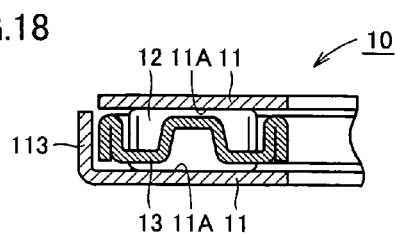

Though FIG. 13 shows a case in which a pair of bearing washers 11 is provided, a single bearing washer 11 may be provided as shown in FIGS. 19 to 23. In addition, though FIG. 13 shows a case in which bearing washer 11 has flanges 111, 113, one or both of the bearing washers may not have flange 111, 113, as shown in FIGS. 15 to 18 and FIG. 23. Moreover, though FIG. 13 shows a case in which flanges 111, 113 of bearing washer 11 have projection portions 112 and 114 respectively, one or both thereof may not have projection portions 112 and 114 as shown in FIGS. 14 to 23. Here, bearing washer 11 not having projection portions 112 and 114 can be separated from cage 13 and rolling element 12 held by cage 13.

The heat treatment method is also basically the same as in Embodiments 1 and 2, however, bearing washer 11 may have flanges 111, 113 as described above. In such a case, other heat treatment method should be selected as the heat treatment method, among the methods of manufacturing thrust bearing 10 in Embodiments 1 and 2. In the following, an embodiment of the present invention when bearing washer 11 has flanges 111, 113 will be described with reference to the drawings.

Figure 24:
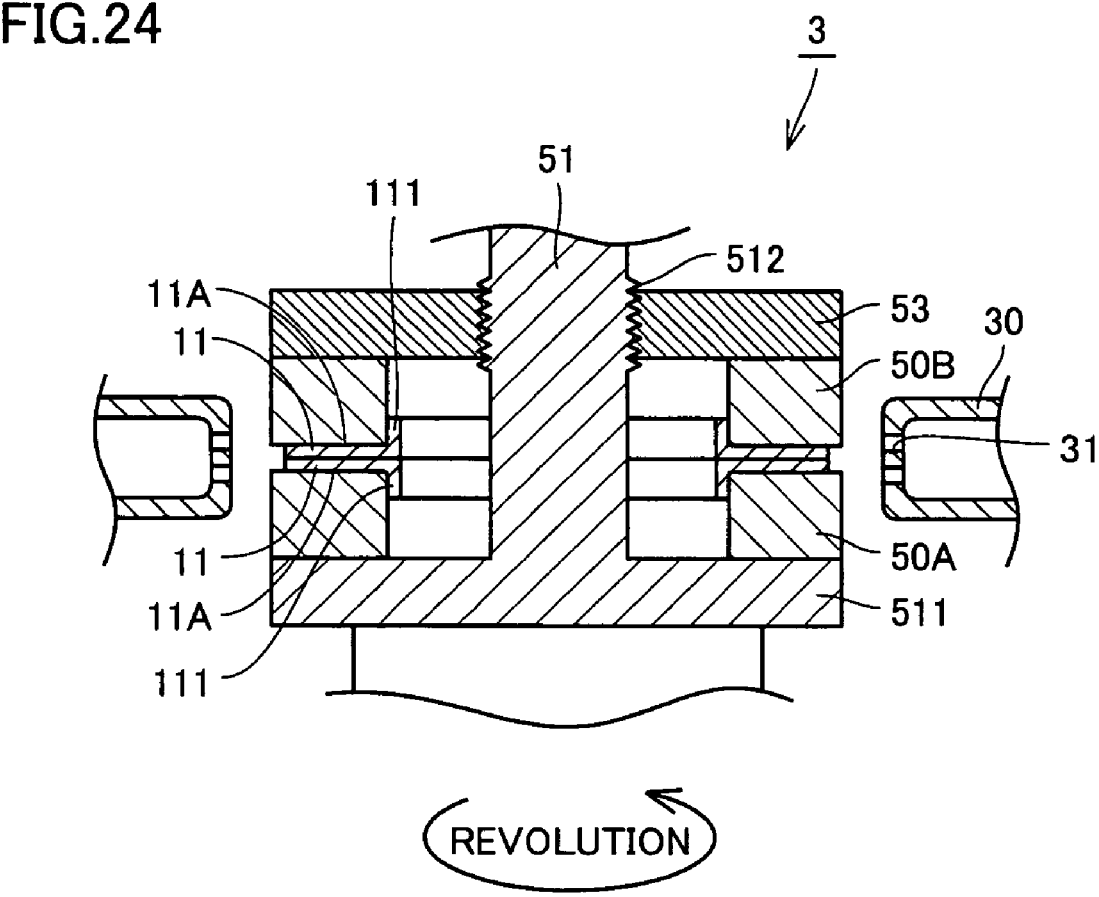
FIG. 24 shows one example of an induction heat treatment apparatus used in the step of manufacturing the bearing washer according to Embodiment 3.

Referring to FIG. 24, one example of a method of heat treatment of bearing washer 11 in Embodiment 3 will be described in detail.

Referring to FIG. 24, induction heat treatment apparatus 3 according to Embodiment 3 and induction heat treatment apparatus 3 shown in FIG. 9 according to Embodiment 1 described above are structured basically in a similar manner. Bearing washer 11 subjected to heat treatment in Embodiment 3, however, has inner flange 111. Accordingly, for example, if two bearing washers 11 are subjected to heat treatment, initially, first bearing washer 11 is arranged with rolling contact surface 11A facing down, such that the entire rolling contact portion of rolling contact surface 11A comes in contact with a flat upper surface of lower portion securing jig 50A. Then, second bearing washer 11 is arranged on first bearing washer 11, with rolling contact surface 11A facing up. In addition, upper portion securing jig 50B is arranged thereon, such that its flat lower surface comes in contact with the entire rolling contact portion of rolling contact surface 11A. In this manner, in bearing washer 11, stress in a direction pressing rolling contact surface 11A is applied to the entire rolling contact portion of bearing washer 11, as in FIG. 9.

Then, a high-frequency current is fed to induction coil 30, and heat treatment thereafter is performed in a manner the same as in Embodiment 1 shown in FIG. 9. In this manner, bearing washer 11 having inner flange 111 is quenched and tempered, with the stress in a direction pressing rolling contact surface 11A being applied at least to the entire rolling contact portion of the bearing washer.

Heat treatment using an induction heat treatment apparatus according to a first variation will be described with reference to FIG. 25.

Figure 25:
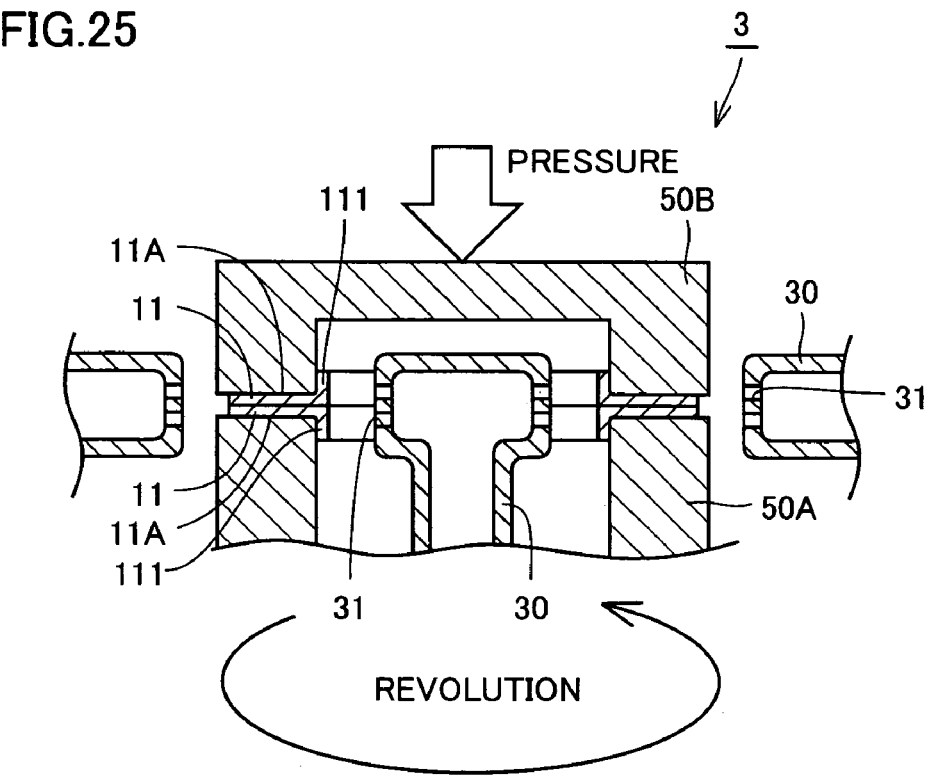
FIG. 25 is a schematic cross-sectional view showing a first variation of the induction heat treatment apparatus used in the step of manufacturing the bearing washer according to Embodiment 3.

Referring to FIG. 25, induction heat treatment apparatus 3 according to the first variation of Embodiment 3 and induction heat treatment apparatus 3 shown in FIG. 24 according to Embodiment 3 described above are structured basically in a similar manner. In FIG. 24, central shaft 51 is provided, and the stress is applied to bearing washer 11 by using lower portion securing jig 50A, upper portion securing jig 50B and jig-retaining nut 53, as in FIG. 9. On the other hand, in FIG. 25, induction coil 30 is arranged on the inner circumferential side of bearing washer 11, as in FIG. 10.

A procedure for heat treatment according to the present variation will now be described. Initially, as in FIG. 24, lower portion securing jig 50A, bearing washer 11 and upper portion securing jig 50B are arranged. Then, a pressure is applied to upper portion securing jig 50B as in FIG. 10 without using jig-retaining nut 53, so as to secure bearing washer 11. Then, a high-frequency current is fed to induction coil 30, and heat treatment thereafter is performed in a manner the same as in Embodiment 1 shown in FIG. 9. In this manner, bearing washer 11 having inner flange 111 is quenched and tempered, with the stress in a direction pressing rolling contact surface 11A being applied at least to the entire rolling contact portion of the bearing washer.

Heat treatment using an induction heat treatment apparatus according to second and third variations will be described with reference to FIGS. 26 and 27.

Figure 26:
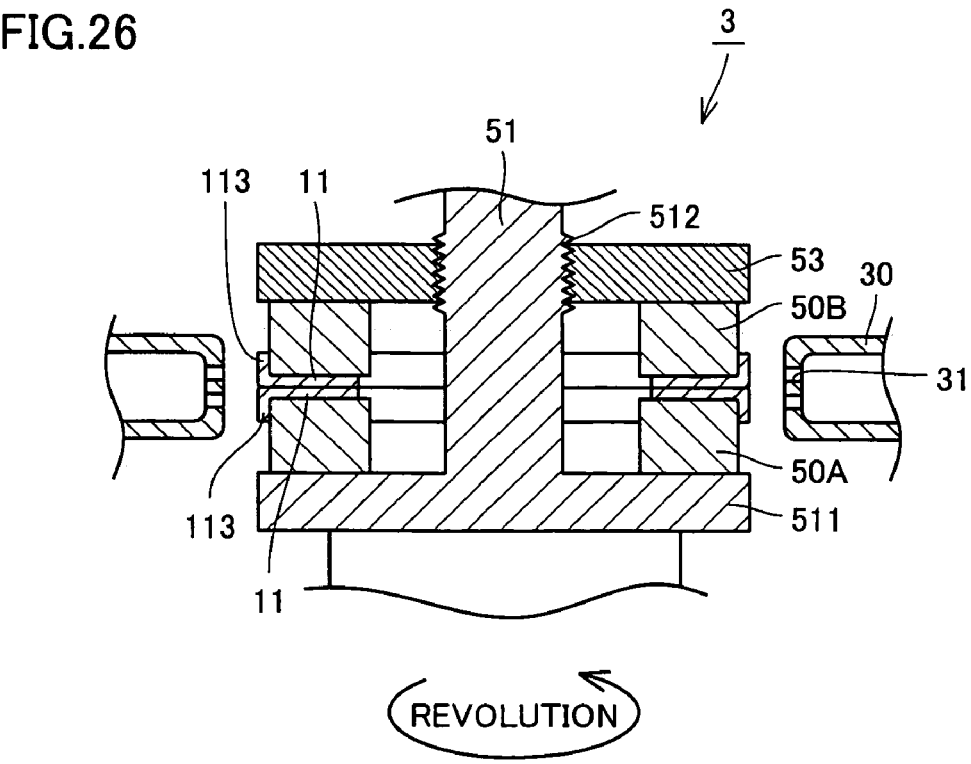
FIG. 26 is a schematic cross-sectional view showing a second variation of the induction heat treatment apparatus used in the step of manufacturing the bearing washer according to Embodiment 3.
Figure 27:
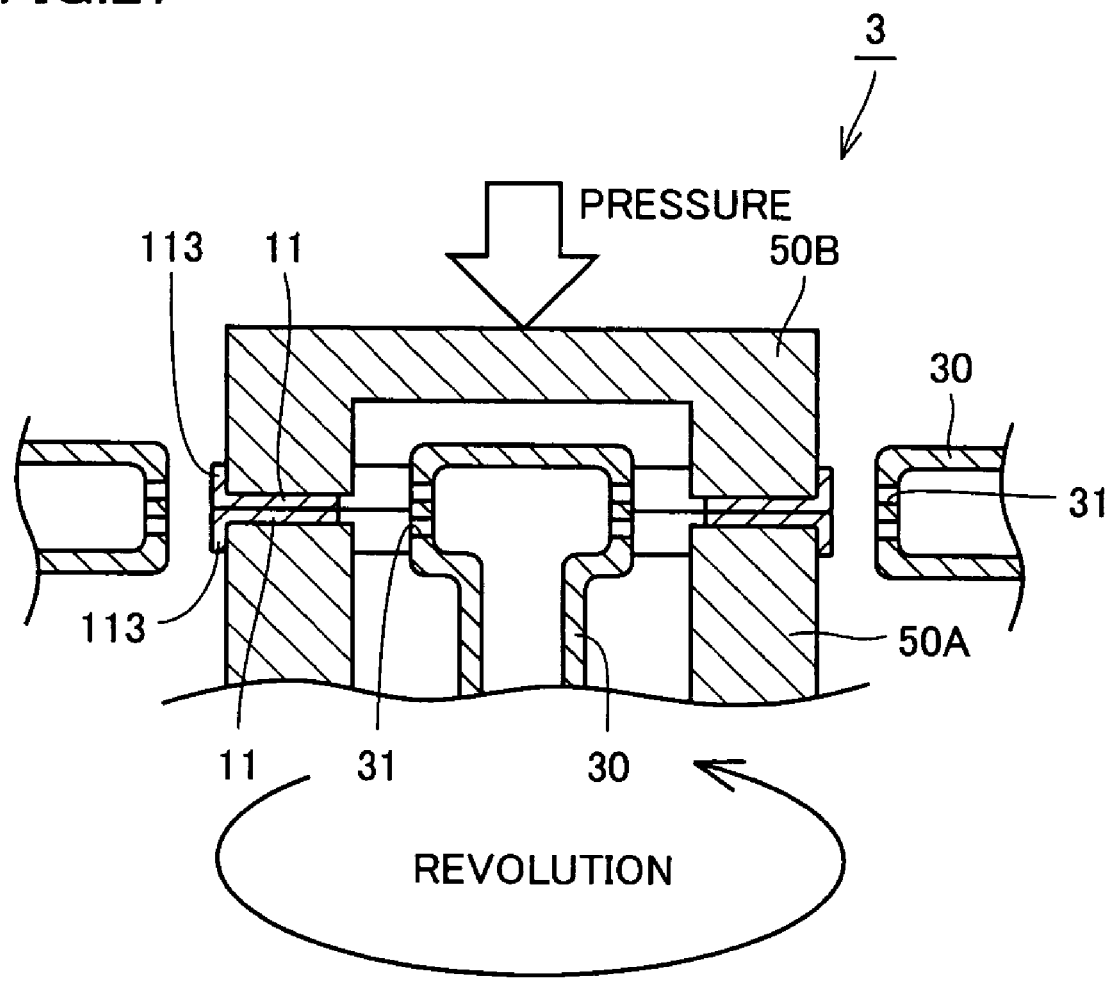
FIG. 27 is a schematic cross-sectional view showing a third variation of the induction heat treatment apparatus used in the step of manufacturing the bearing washer according to Embodiment 3.

Referring to FIGS. 26 and 27, induction heat treatment apparatus 3 according to the second and third variations and induction heat treatment apparatus 3 according to Embodiment 3 and the first variation in FIGS. 24 and 25 are structured basically in a similar manner. FIGS. 24 and 25 show bearing washer 11 having inner flange 111, while FIGS. 26 and 27 show bearing washer 11 having outer flange 113. Here, if bearing washer 11 is secured with outer flange 113 projecting radially outward from securing jigs 50A, 50B as shown in FIGS. 26 and 27, bearing washer 11 can be subjected to quenching and tempering in a state secured as in FIGS. 24 and 25 above.

The method of measuring camber/waviness is also basically the same as in Embodiments 1 and 2, however, bearing washer 11 may have flanges 111, 113 as described above. If a method of screening bearing washer 11 described in connection with FIG. 12 in Embodiment 2 is employed, the screening method should partially be modified.

A method of screening bearing washer 11 based on magnitude of camber/waviness when bearing washer 11 has flanges 111, 113 will now be described with reference to FIGS. 28 and 29.

Figure 28:
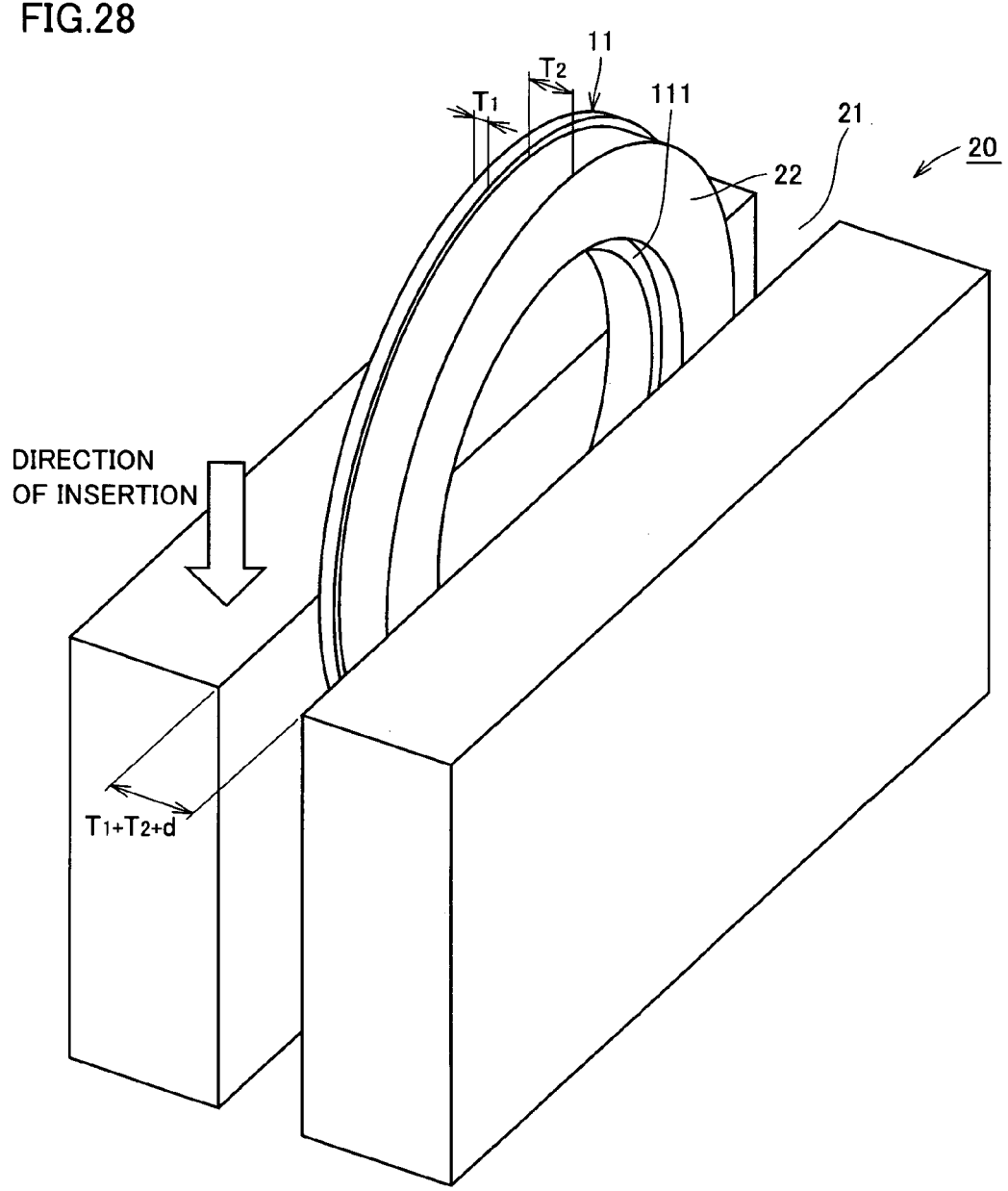
FIG. 28 is a perspective view showing a method of screening a bearing washer using a magnitude of camber/waviness as reference when the bearing washer has an inner flange.
Figure 29:
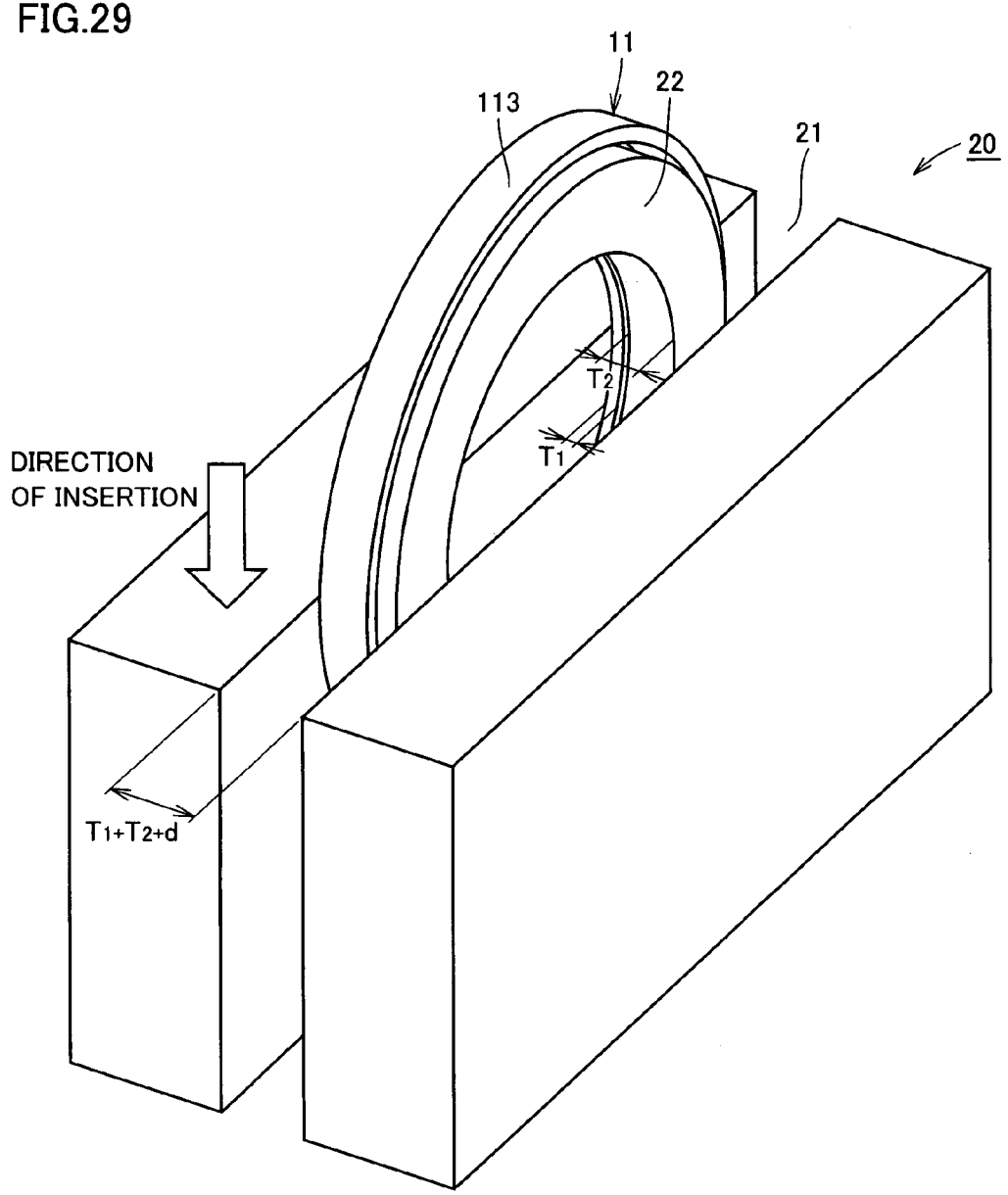
FIG. 29 is a perspective view showing a method of screening a bearing washer using a magnitude of camber/waviness as reference when the bearing washer has an outer flange.

Referring to FIGS. 28 and 29, slit gauge 20 is structured basically the same as in FIG. 12. On the other hand, difference consists in that slit 21 has a width of $T_1+T_2+d$. In addition, difference consists also in the use of a measurement jig 22. Measurement jig 22 has a cylindrical shape with its opposing bottom surfaces extending in parallel, and has a thickness $T_2$ larger than the height of flanges 111, 113.

The bottom surface of measurement jig 22 is brought in contact with rolling contact surface 11A of bearing washer 11 on the entire perimeter, and the jig and the bearing washer are inserted in slit 21. If camber/waviness of bearing washer 11 is not larger than d, bearing washer 11 can pass through. On the other hand, camber/waviness of bearing washer 11 exceeds d, bearing washer 11 cannot pass through. Here, if d is set to 40 μm, bearing washer 11 having camber/waviness not smaller than 40 μm can be screened. When the bearing washer group constituted of bearing washers 11 according to Embodiment 3 is thus screened, a probability of detection of the bearing washer of which camber/waviness is equal to or larger than 40 μm is at most 0.1%.

Embodiment 4

If bearing washer 11 for thrust bearing 10 has inner flange 111 or outer flange 113, other heat treatment method instead of the method described in Embodiment 3 may be selected as the method of heat treatment of bearing washer 11.

Figure 30:
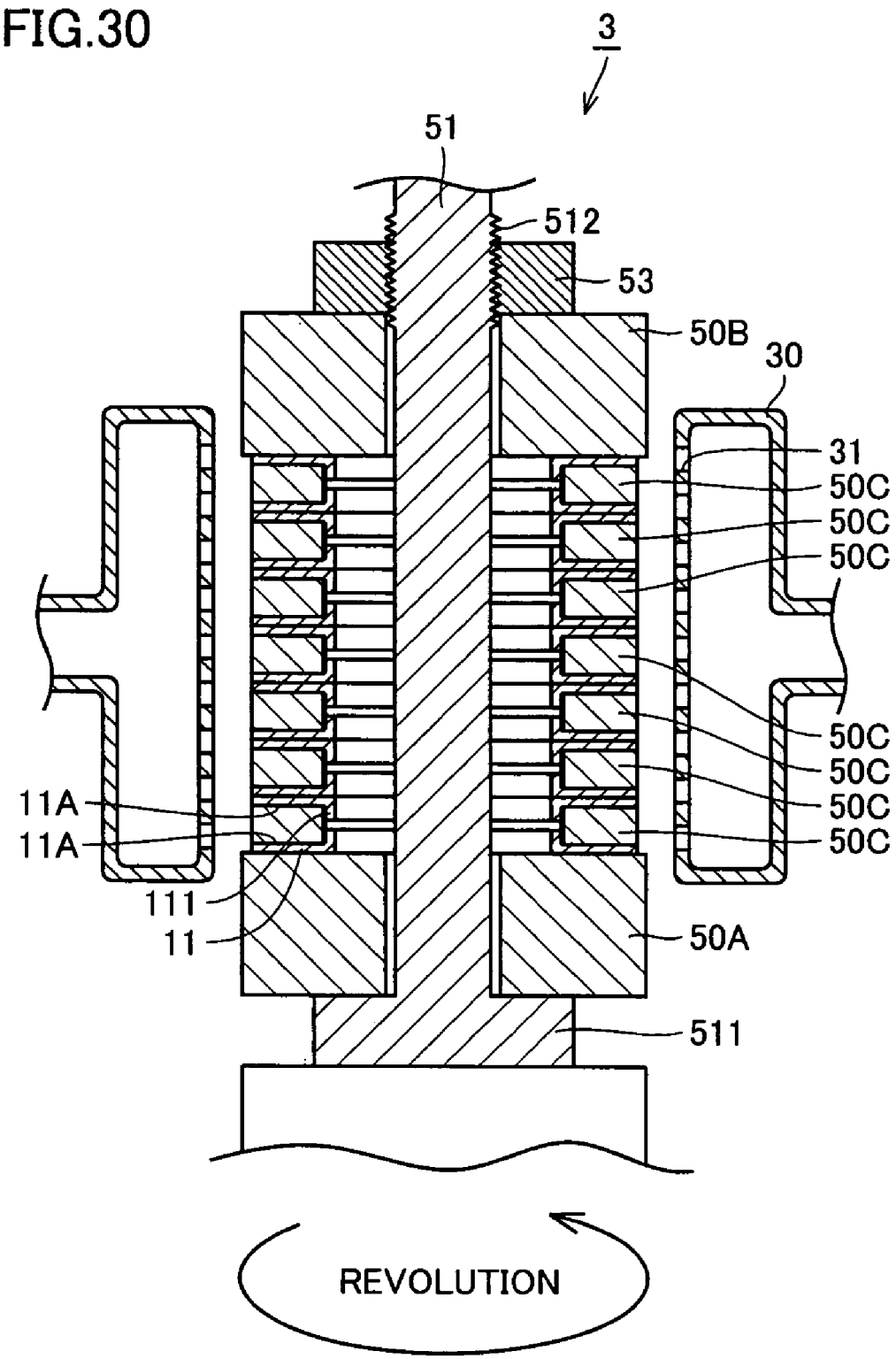
FIG. 30 shows one example of an induction heat treatment apparatus used in the step of manufacturing the bearing washer according to Embodiment 4.

Referring to FIG. 30, one example of a method of heat treatment of bearing washer 11 in Embodiment 4 will be described in detail.

Referring to FIG. 30, induction heat treatment apparatus 3 according to Embodiment 4 and induction heat treatment apparatus 3 in FIG. 9 described above are structured basically in a similar manner. In Embodiment 4, however, bearing washer 11 has inner flange 111. Therefore, induction heat treatment apparatus 3 shown in FIG. 30 is different from induction heat treatment apparatus 3 shown in FIG. 9 in having an intermediate portion securing jig 50C. For example, intermediate portion securing jig 50C has an inner diameter larger than that of bearing washer 11, and has a cylindrical shape, with its upper and lower surfaces being flat and extending in parallel.

A procedure for heat treatment will now be described with reference to FIG. 30.

First bearing washer 11 is arranged so as to come in contact with lower portion securing jig 50A, with rolling contact surface 11A facing up. Intermediate portion securing jig 50C is arranged on first bearing washer 11, such that its flat lower surface comes in contact with at least the entire rolling contact portion of rolling contact surface 11A of bearing washer 11. Then, second bearing washer 11 is arranged on intermediate portion securing jig 50C such that at least the entire rolling contact portion of rolling contact surface 11A of bearing washer 11 comes in contact with the flat upper surface of intermediate portion securing jig 50C. Assuming a combination of intermediate portion securing jig 50C with two bearing washers 11, 11 as one set, several sets are stacked in a manner remaining in a heating range of induction coil 30. Upper portion securing-jig 50B is arranged on the stack, and tightened by jig-retaining nut 53 as in FIG. 9. In bearing washer 11, the stress in a direction pressing rolling contact surface 11A is thus applied to the entire rolling contact portion. In such a state, bearing washer 11 is quenched and tempered, with the stress in a direction pressing the rolling contact surface being applied at least to the entire rolling contact portion of bearing washer 11, as in FIG. 9.

Heat treatment using an induction heat treatment apparatus according to first and second variations will be described with reference to FIGS. 31 and 32.

FIG. 30 shows a case in which central shaft 51 and jig-retaining nut 53 are used. As in induction heat treatment apparatus 3 shown in FIG. 31, however, the structure may be such that induction coil 30 is arranged on the inner circumferential side of bearing washer 11, instead of central shaft 51 and jig-retaining nut 53 as in FIG. 10. Alternatively, as in induction heat treatment apparatus 3 shown in FIG. 32, the structure may be such that central shaft 51 moves relative to induction coils 30A and 30B as in FIG. 11. Here, securing of bearing washer 11 is achieved in a manner the same as in FIG. 30, and a procedure for heat treatment thereafter is the same as in FIGS. 10 and 11.

Heat treatment using an induction heat treatment apparatus according to third, fourth and fifth variations will be described with reference to FIGS. 33 to 35.

Figure 31:
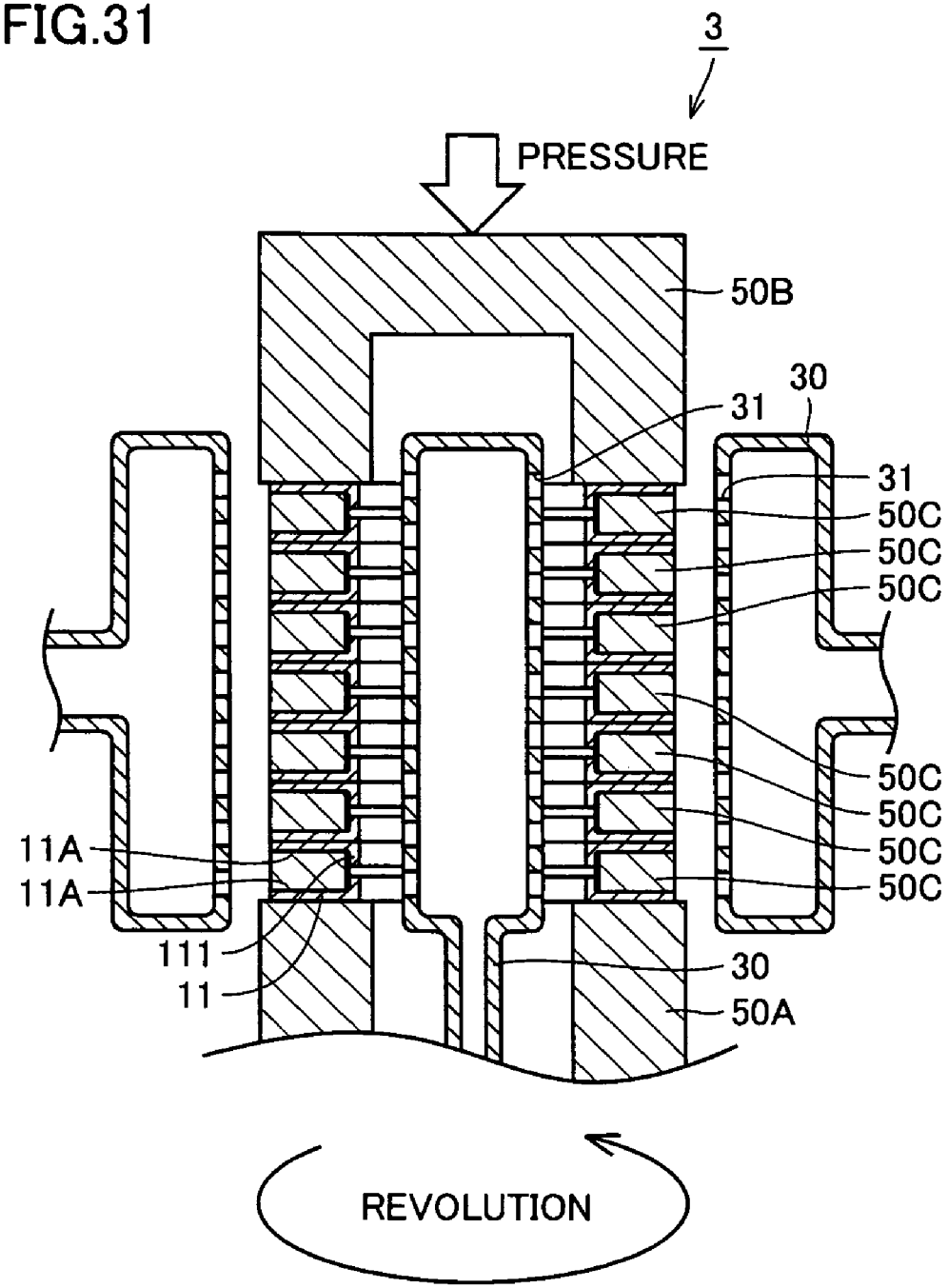
FIG. 31 is a schematic cross-sectional view showing a first variation of the induction heat treatment apparatus used in the step of manufacturing the bearing washer according to Embodiment 4.
Figure 32:
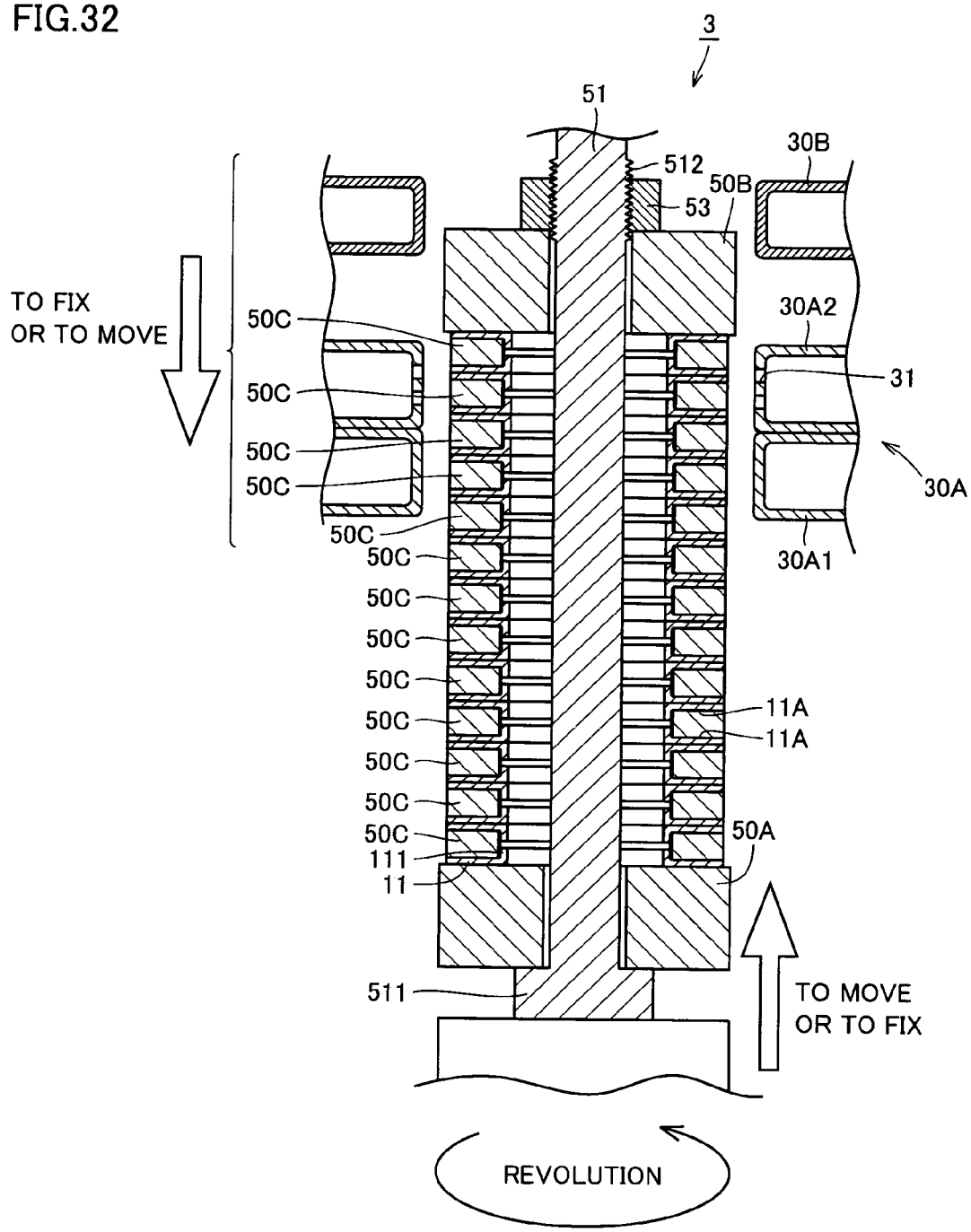
FIG. 32 is a schematic cross-sectional view showing a second variation of the induction heat treatment apparatus used in the step of manufacturing the bearing washer according to Embodiment 4.
Figure 33:
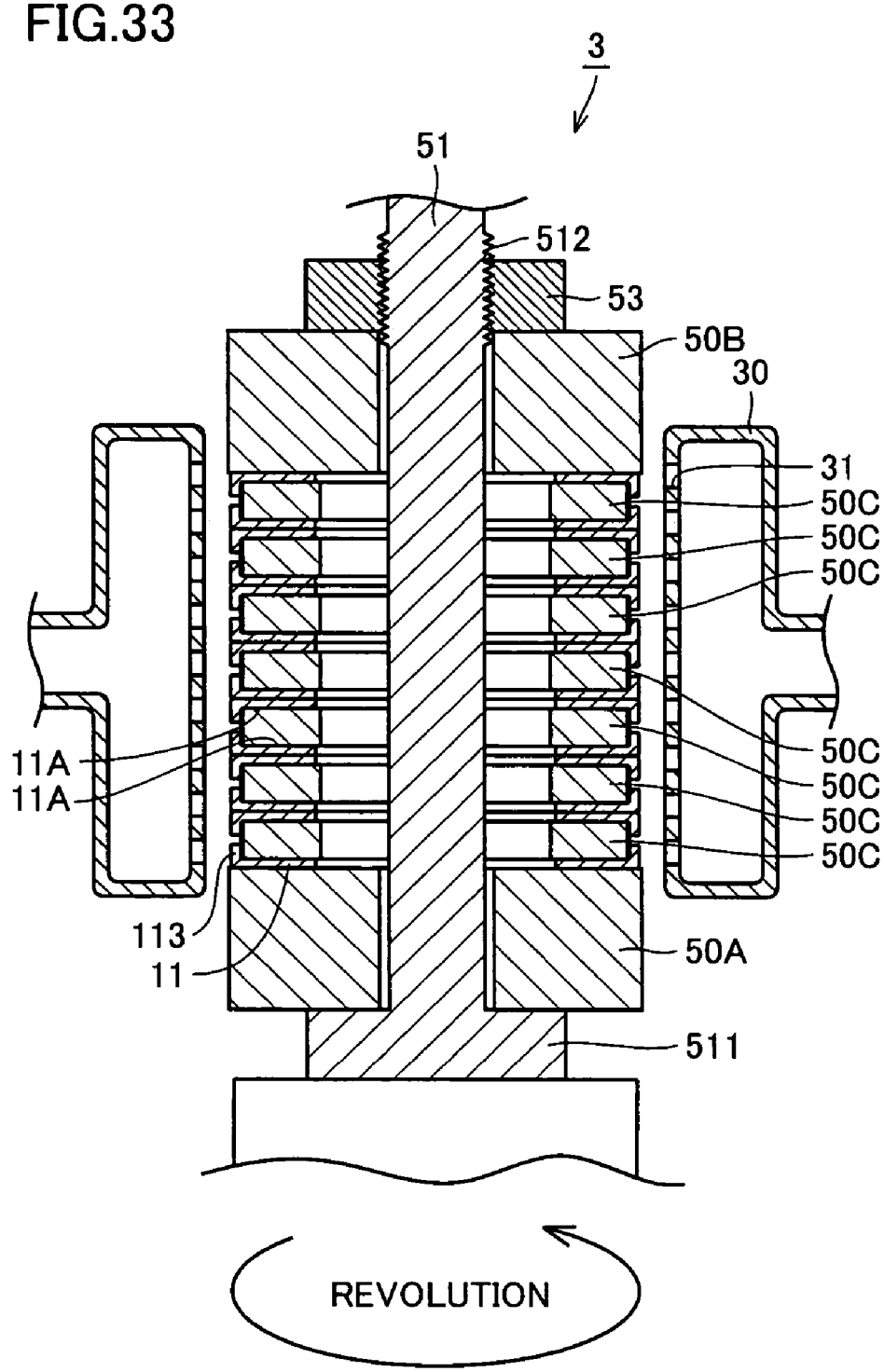
FIG. 33 is a schematic cross-sectional view showing a third variation of the induction heat treatment apparatus used in the step of manufacturing the bearing washer according to Embodiment 4.
Figure 34:
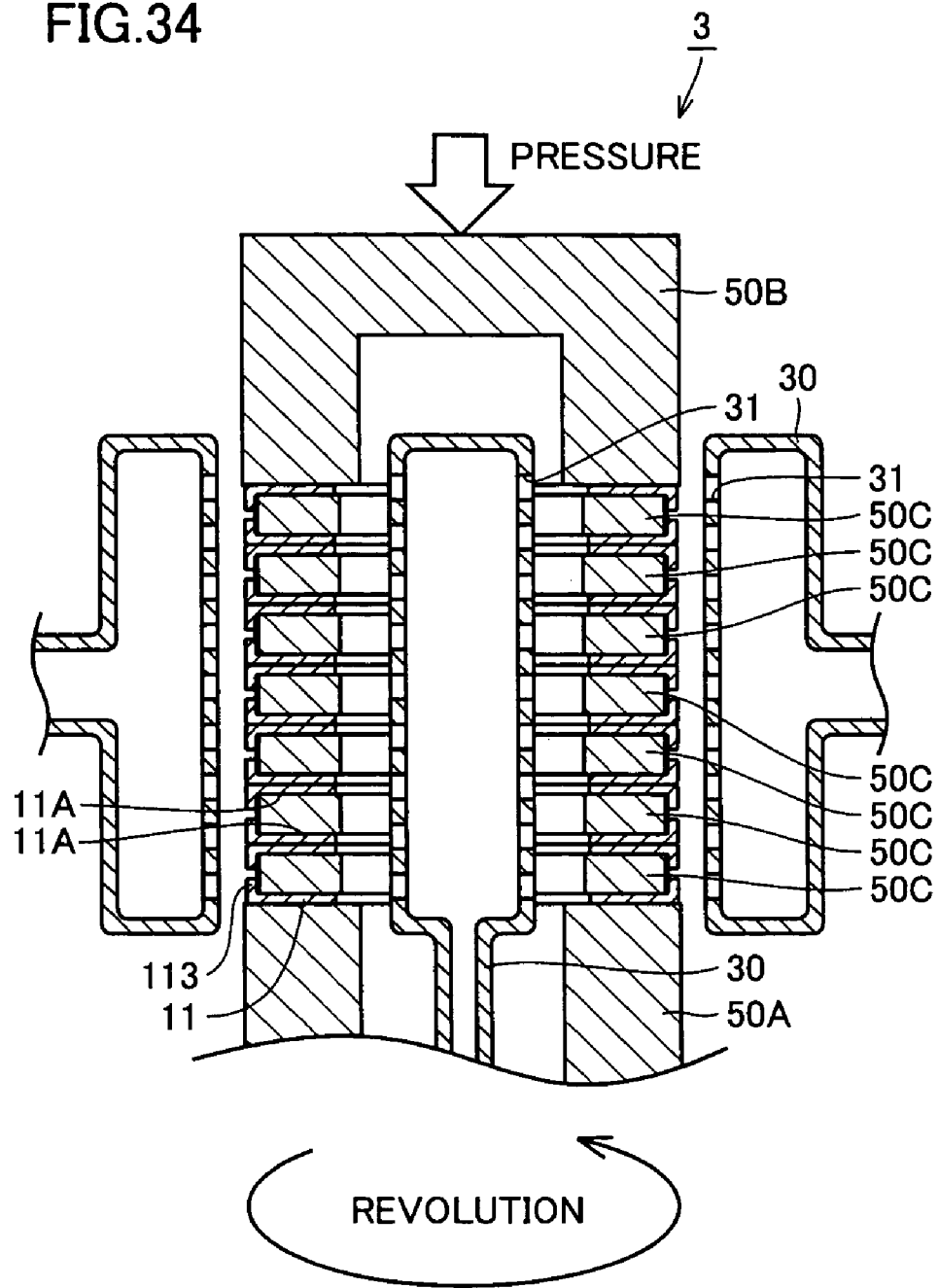
FIG. 34 is a schematic cross-sectional view showing a fourth variation of the induction heat treatment apparatus used in the step of manufacturing the bearing washer according to Embodiment 4.
Figure 35:
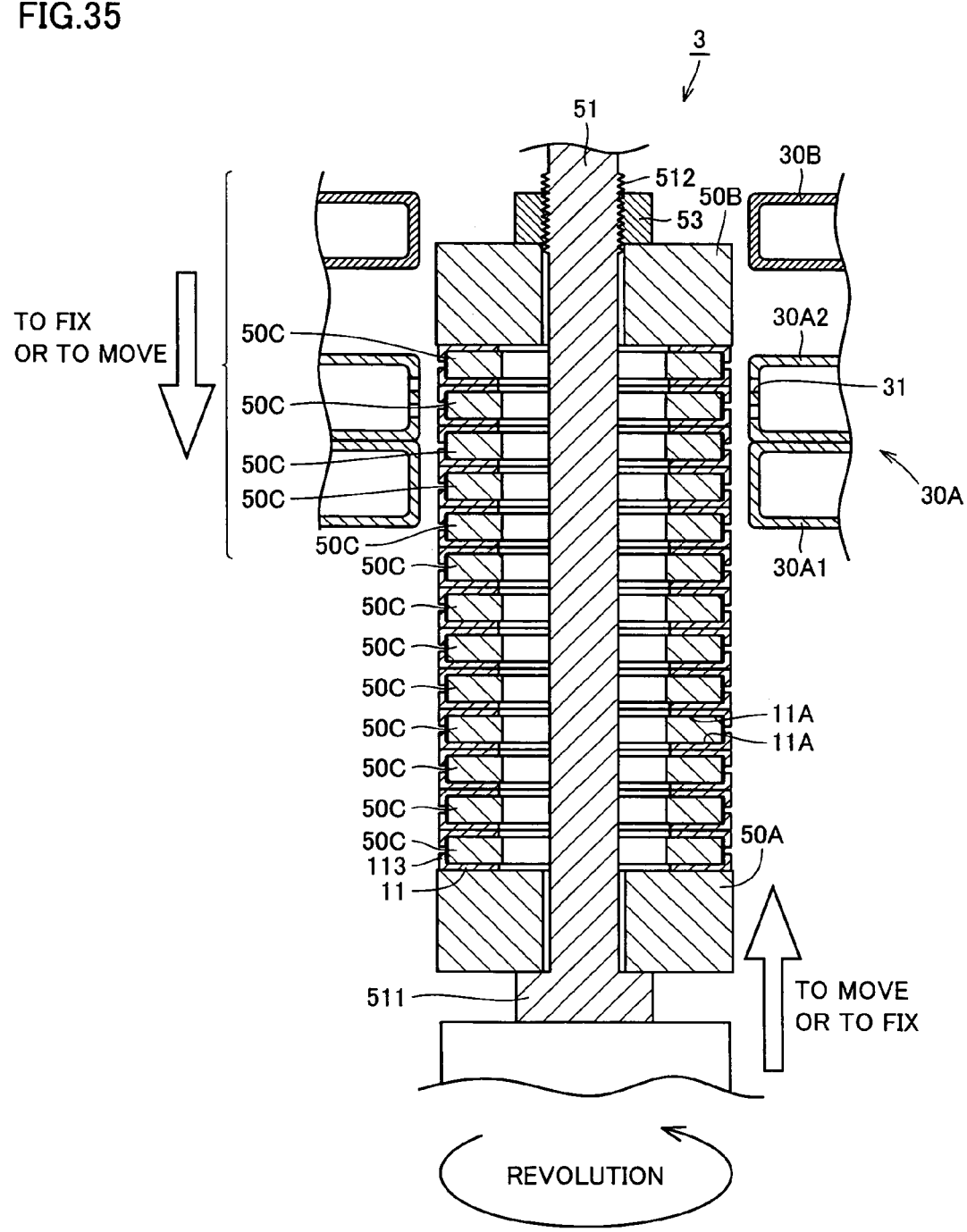
FIG. 35 is a schematic cross-sectional view showing a fifth variation of the induction heat treatment apparatus used in the step of manufacturing the bearing washer according to Embodiment 4.

Referring to FIGS. 33 to 35, induction heat treatment apparatus 3 according to the third, fourth and fifth variations shown in FIGS. 33 to 35 and induction heat treatment apparatus 3 according to Embodiment 4 and the first and second variations shown in FIGS. 30 to 32 described above are structured basically in a similar manner. FIGS. 30 to 32 show bearing washer 11 having inner flange 111, while FIGS. 33 to 35 show bearing washer 11 having outer flange 113. Here, if bearing washer 11 is secured with outer flange 113 projecting radially outward from intermediate portion securing jig 50C as shown in FIGS. 33 to 35, bearing washer 11 can be quenched and tempered in a state secured as in the method described in connection with FIGS. 30 to 32.

Embodiment 5

By combining bearing washer 11 having inner flange 111 or outer flange 113 with bearing washer 11 not having inner flange 111 and outer flange 113, yet other heat treatment method may be selected as the method of heat treatment of bearing washer 11.

Figure 36:
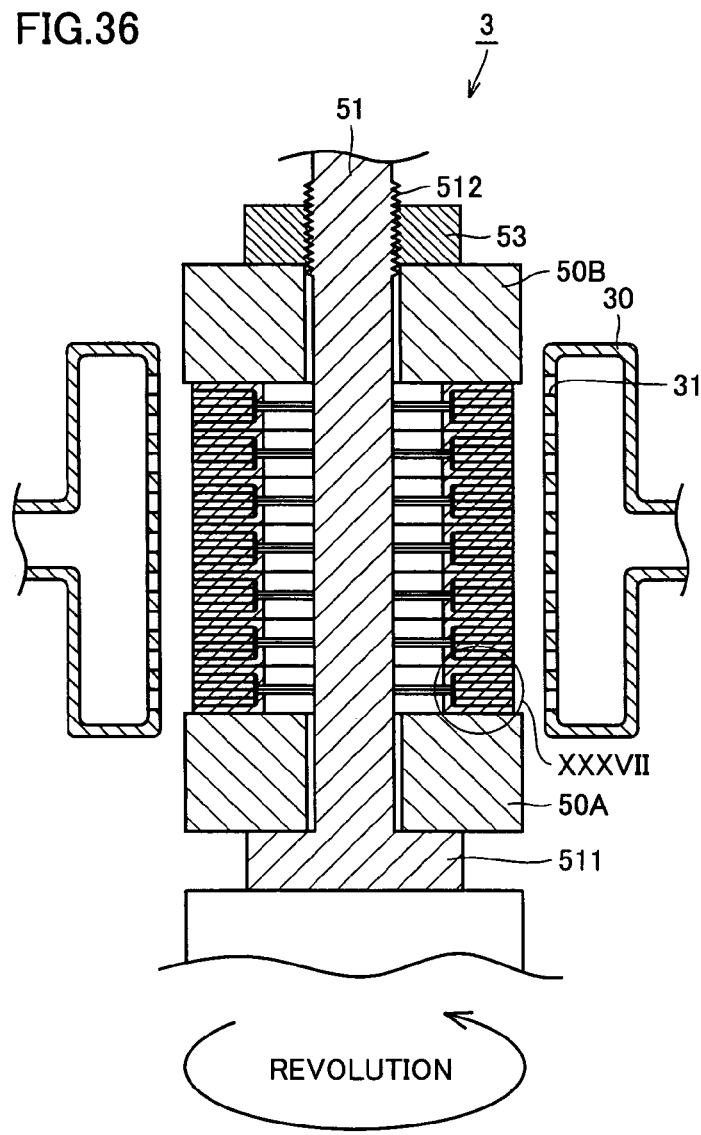
FIG. 36 shows one example of an induction heat treatment apparatus used in the step of manufacturing the bearing washer according to Embodiment 5.
Figure 37:
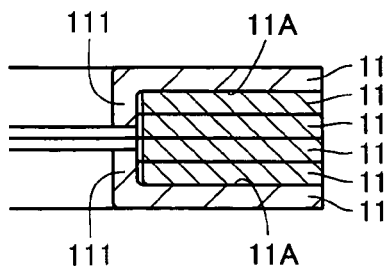
FIG. 37 is a partially enlarged view of a region XXXVII in FIG. 36.

Referring to FIGS. 36 and 37, one example of a method of heat treatment of bearing washer 11 in Embodiment 5 will be described in detail.

Referring to FIGS. 36 and 37, induction heat treatment apparatus 3 according to Embodiment 5 and induction heat treatment apparatus 3 in FIG. 30 described above are structured basically in a similar manner. Induction heat treatment apparatus 3 in Embodiment 5 is different from induction heat treatment apparatus 3 in FIG. 30 in that bearing washer 11 not having flanges 111, 113 is used instead of intermediate portion securing jig 50C.

In the following, a procedure for heat treatment will be described with reference to FIGS. 36 and 37.

First bearing washer 11 having inner flange 111 is arranged so as to come in contact with lower portion securing jig 50A, with rolling contact surface 11A facing up. Bearing washer 11 not having flanges 111, 113 is arranged on first bearing washer 11 so as to come in contact with at least the entire rolling contact portion of rolling contact surface 11A of bearing washer 11 having inner flange 111. Then, second bearing washer 11 having inner flange 111 is arranged on bearing washer 11 not having flanges 111, 113, such that at least the entire rolling contact portion of rolling contact surface 11A of bearing washer 111 having inner flange 111 comes in contact with bearing washer 11 not having flanges 111, 113. In order to allow such an arrangement, a plurality of bearing washers 11 not having flanges 111, 113 may be arranged in a stacked manner. Assuming a combination of bearing washers 11 as one set, several sets are stacked in a manner remaining in a heating range of induction coil 30. Bearing washer 11 is thus quenched and tempered, with the stress in a direction pressing rolling contact surface 11A being applied at least to the entire rolling contact portion of bearing washer 11, as in FIG. 30.

Figure 38:
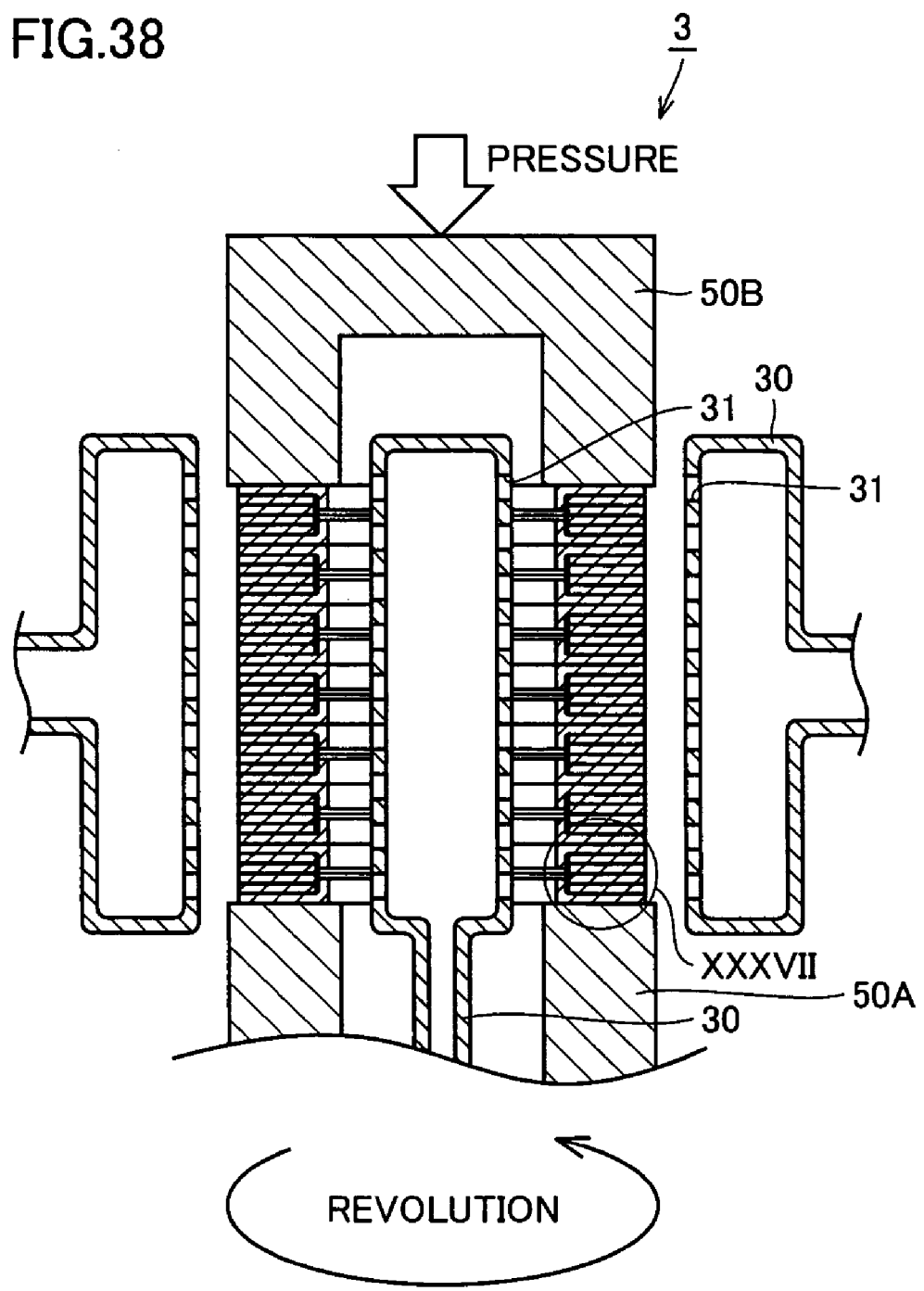
FIG. 38 is a schematic cross-sectional view showing a first variation of the induction heat treatment apparatus used in the step of manufacturing the bearing washer according to Embodiment 5.
Figure 39:
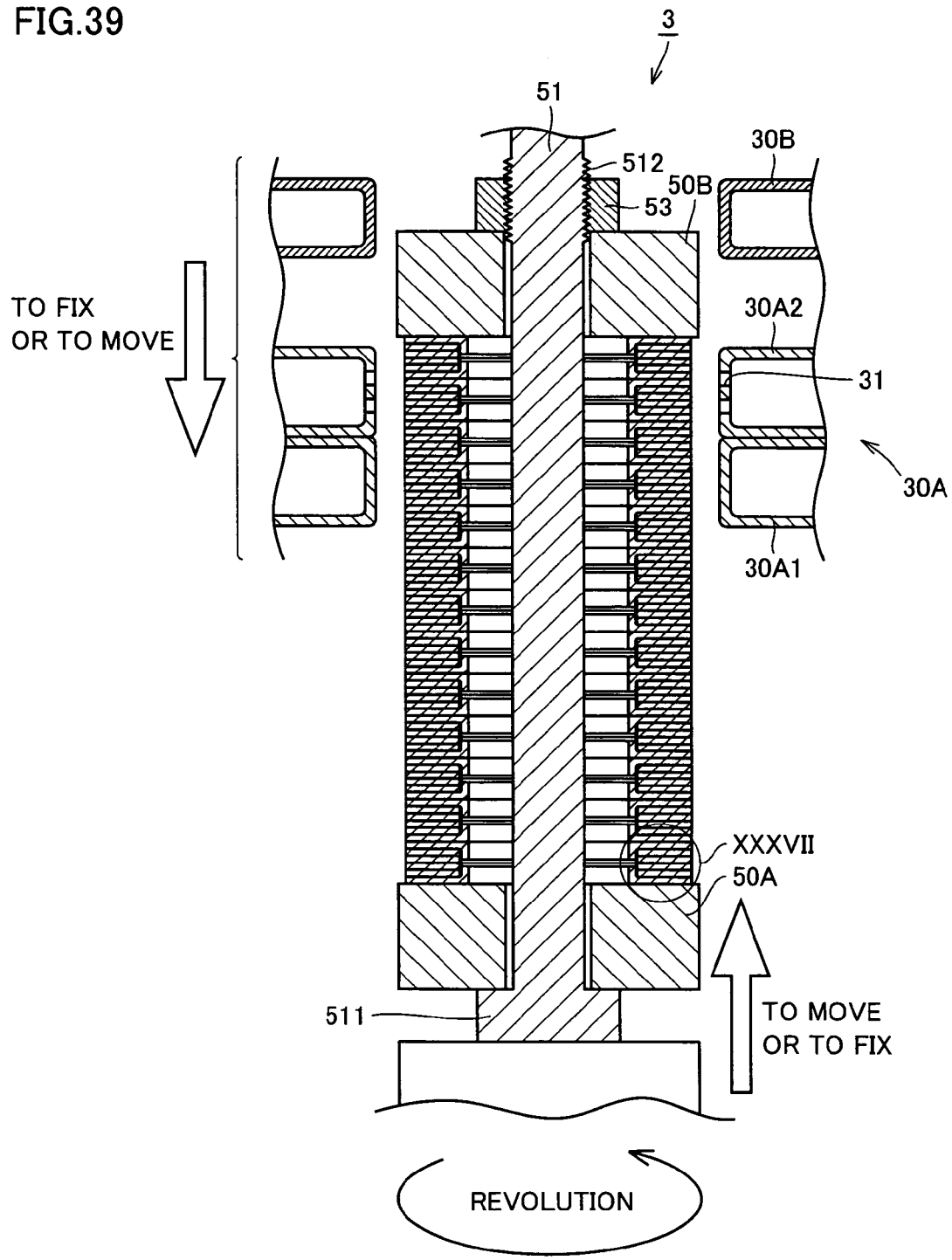
FIG. 39 is a schematic cross-sectional view showing a second variation of the induction heat treatment apparatus used in the step of manufacturing the bearing washer according to Embodiment 5.
Figure 40:
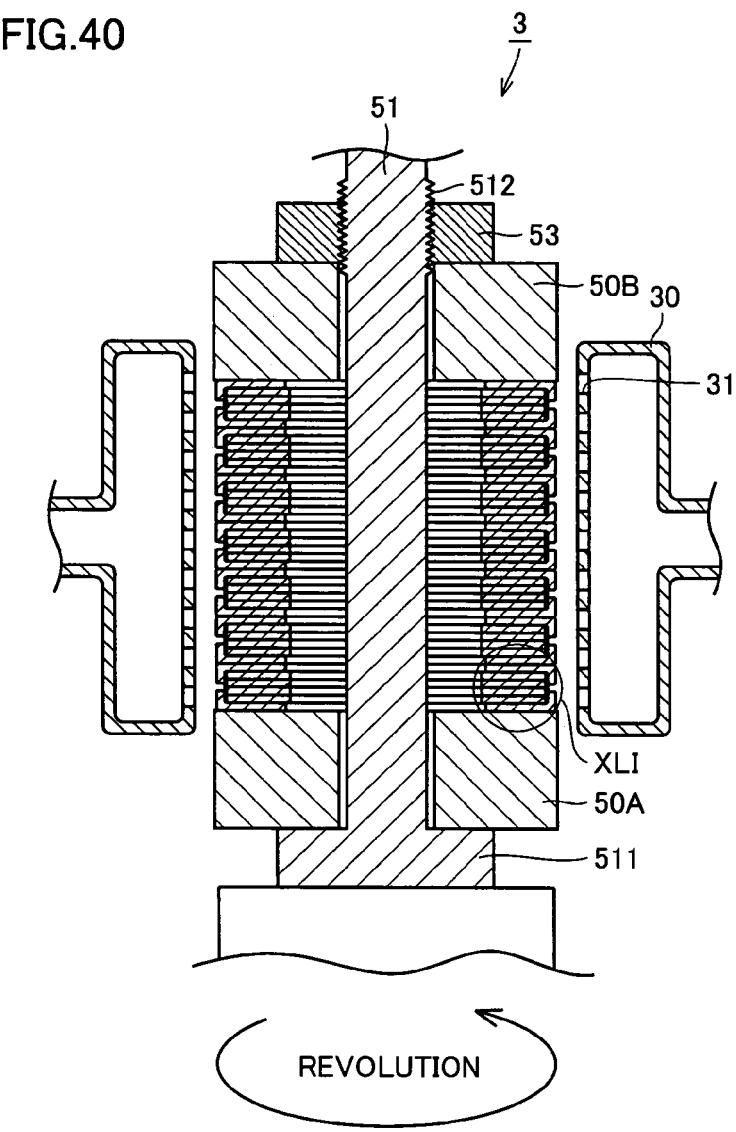
FIG. 40 is a schematic cross-sectional view showing a third variation of the induction heat treatment apparatus used in the step of manufacturing the bearing washer according to Embodiment 5.
Figure 41:
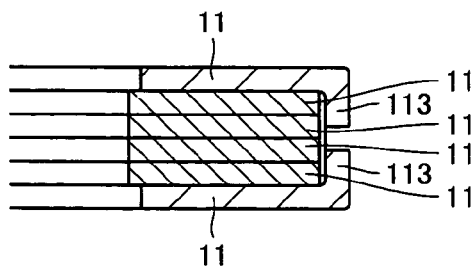
FIG. 41 is a partially enlarged view of a region XLI in FIG. 40.
Figure 42:
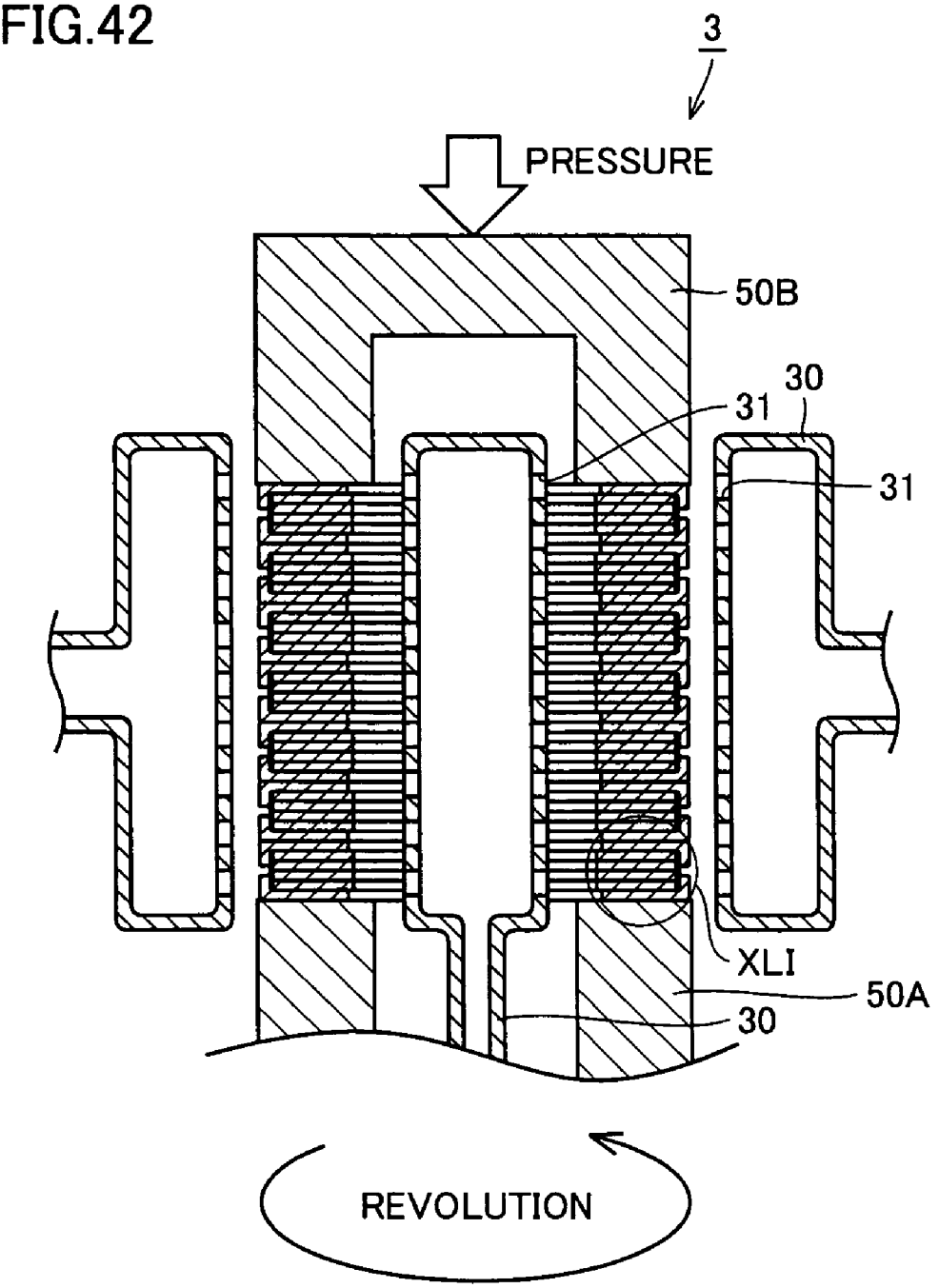
FIG. 42 is a schematic cross-sectional view showing a fourth variation of the induction heat treatment apparatus used in the step of manufacturing the bearing washer according to Embodiment 5.
Figure 43:
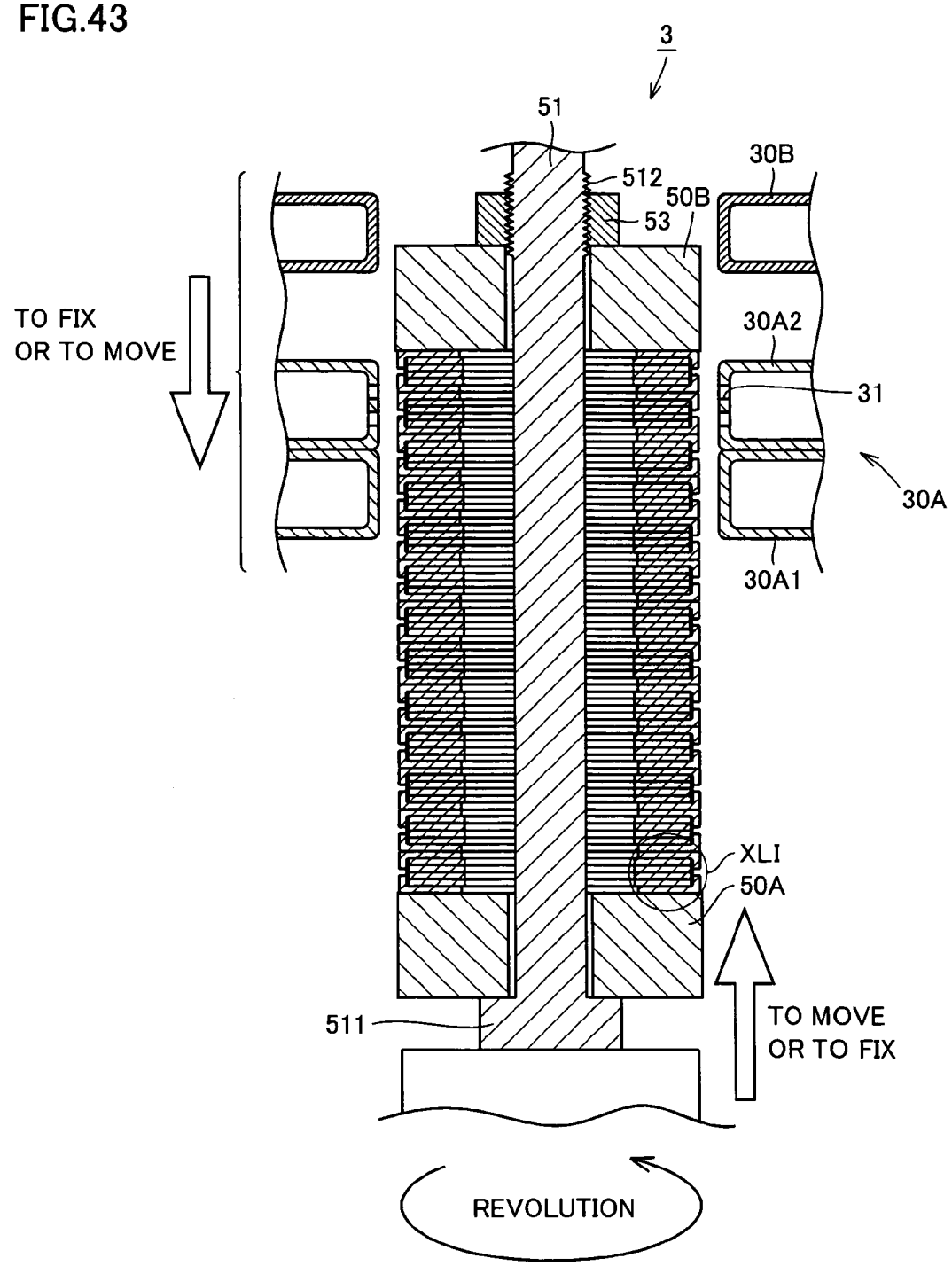
FIG. 43 is a schematic cross-sectional view showing a fifth variation of the induction heat treatment apparatus used in the step of manufacturing the bearing washer according to Embodiment 5.

Heat treatment using an induction heat treatment apparatus according to first and-second variations will be described with reference to FIGS. 38 and 39.

FIG. 36 shows a case in which central shaft 51 and jig-retaining nut 53 are used. As in induction heat treatment apparatus 3 shown in FIG. 38, however, the structure may be such that induction coil 30 is arranged on the inner circumferential side of bearing washer 11, instead of central shaft 51 and jig-retaining nut 53 as in FIG. 10. Alternatively, as in induction heat treatment apparatus 3 shown in FIG. 39, the structure may be such that central shaft 51 moves relative to induction coils 30A and 30B as in FIG. 11. Here, securing of bearing washer 11 is achieved in a manner the same as in FIGS. 36 and 37, and a procedure for heat treatment thereafter is the same as in FIGS. 10 and 11.

Heat treatment using an induction heat treatment apparatus according to third, fourth and fifth variations will be described with reference to FIGS. 40 to 43.

Referring to FIGS. 40 to 43, induction heat treatment apparatus 3 according to the third, fourth and fifth variations shown in FIGS. 40 to 43 and induction heat treatment apparatus 3 according to Embodiment 5 and the first and second variations shown in FIGS. 36 to 39 described above are structured basically in a similar manner. FIGS. 36 to 39 show bearing washer 11 having inner flange 111, while FIGS. 40 to 43 show bearing washer 11 having outer flange 113. Here, if bearing washer 11 is secured with outer flange 113 projecting radially outward from bearing washer 11 not having flanges 111, 113 as shown in FIGS. 40 to 43, bearing washer 11 can be subjected to quenching and tempering in a state secured as in the method described in connection with FIGS. 36 to 39.

Embodiment 6

Figure 44:
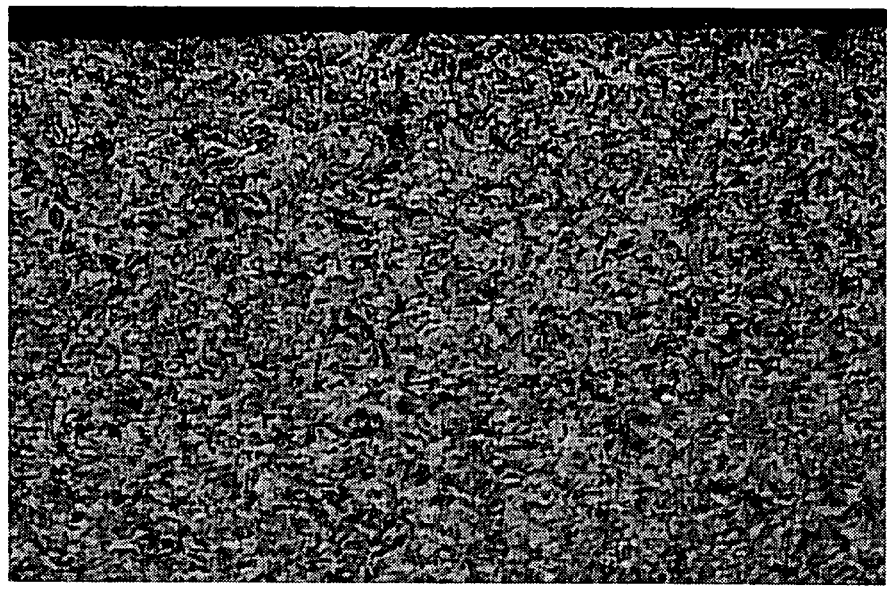
FIG. 44 is an optical microscope photograph of a surface portion directly under a rolling contact portion in a cross-section perpendicular to a rolling, contact surface of a bearing washer included in a thrust bearing according to Embodiment 6.
Figure 45:
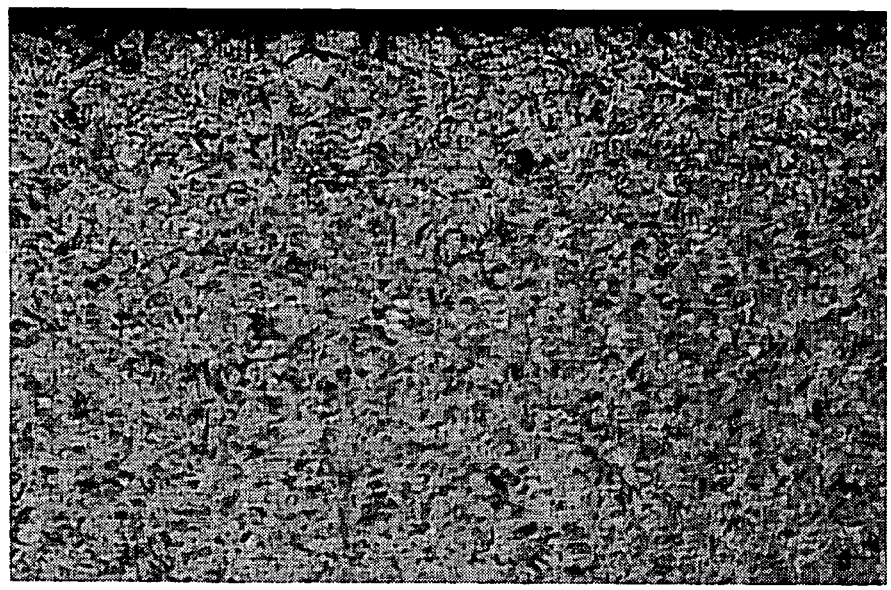
FIG. 45 is an optical microscope photograph of a surface portion directly under a rolling contact portion in a cross-section perpendicular to a rolling contact surface of a bearing washer included in a conventional thrust bearing.

Referring to FIGS. 44 and 45, the bearing washer for the thrust bearing and the thrust bearing according to Embodiment 6 of the present invention will be described. The bearing washer for the thrust bearing and the thrust bearing according to Embodiment 6 are structured basically similar to those in Embodiments 1 to 5 described above. The bearing washer for the thrust bearing and the thrust bearing according to Embodiment 6, however, have the following feature.

Specifically, referring to FIG. 44, a thickness of the intergranular oxidation layer in the surface portion is set to at most 1 μm in bearing washer 11 for thrust bearing 10 according to Embodiment 6. Referring to FIG. 45, a thickness of the intergranular oxidation layer in the surface portion is set to approximately 6 μm in the conventional bearing washer for the thrust bearing.

Here, the intergranular oxidation layer in the surface portion of the bearing washer can be observed, for example, in the following procedure. Initially, the bearing washer is cut in a cross-section perpendicular to the rolling contact surface. Then, the cross-section is mirror polished and immersed in a 3% nital at a room temperature for corrosion. A time period for immersion is set, for example, to approximately 2 to 10 seconds. As susceptibility to corrosion is different depending on a type of the steel, a time period appropriate for each bearing washer is set, considering progress of corrosion. Thereafter, the surface portion directly under the rolling contact surface is observed using an optical microscope.

The thickness of the intergranular oxidation layer in the surface portion of the bearing washer for the thrust bearing according to Embodiment 6 observed with this observation method is at most 1 µm.

A method of manufacturing the bearing washer and the thrust bearing according to Embodiment 6 will now be described. The bearing washer for the thrust bearing and the thrust bearing according to Embodiment 6 can be manufactured with a method similar to that in Embodiments 1 to 5 described above. By adopting such a manufacturing method, in particular by adopting induction heating as described above in the quenching step, a time period for heating in the quenching step can significantly be shortened, as compared with the case employing carburizing heat treatment, bright heat treatment or the like representing a general quench hardening treatment. Consequently, formation of the intergranular oxidation layer can be suppressed.

According to the manufacturing method described above, bearing washer 11 for thrust bearing 10 used without being subjected to grinding after quench hardening and implemented by a member obtained by press working a steel plate, in which a thickness of the intergranular oxidation layer in the surface portion is at most 1 µm, the surface hardness and the internal hardness are set to at least 653 HV, and a steel containing at least 0.4 mass % to at most 1.2 mass % carbon is used as a material, can be manufactured. In addition, thrust bearing 10 including bearing washer 11 structured as above can be manufactured by using bearing washer 11.

Embodiment 7

Referring to FIGS. 46 to 49, the bearing washer for the thrust bearing and the thrust bearing according to Embodiment 7 of the present invention will be described. The bearing washer for the thrust bearing and the thrust bearing according to Embodiment 7 are structured basically similar to those in Embodiments 1 to 5 described above. The bearing washer for the thrust bearing and the thrust bearing according to Embodiment 7, however, have the following feature.

Figure 46:
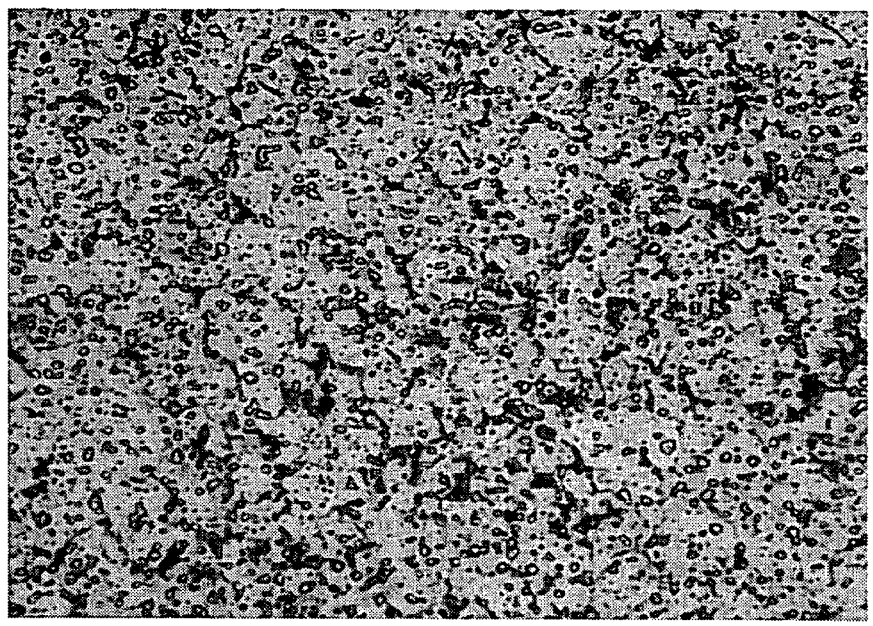
FIG. 46 is an optical microscope photograph of prior austenite grain boundary in a central portion in a cross-section perpendicular to a rolling contact surface of a bearing washer included in a thrust bearing according to Embodiment 7.

Specifically, referring to FIG. 46, prior austenite grain boundary can hardly be observed in the central portion of the cross-section perpendicular to rolling contact surface 11A of bearing washer 11 for the thrust bearing according to Embodiment 7. This may be because formation of prior austenite grain boundary is not sufficiently progressed, as shown in FIG. 48. The region enclosed by prior austenite grain boundary in this field of view occupies at most 10% of the entire field of view. In addition, if a measurement area having an actual size of 225 µm×175 µm is set in the central portion of the field of view, a ratio of the region enclosed by prior austenite grain boundary in the measurement area is at most 10% of the entire area. Meanwhile, referring to FIG. 47, in the conventional bearing washer for the thrust bearing, prior austenite grain boundary can clearly be observed in the central portion of the cross-section perpendicular to the rolling contact surface. This may be because formation of prior austenite grain boundary is sufficiently progressed, as shown in FIG. 49. The region enclosed by prior austenite grain boundary in this field of view occupies at least 90% of the entire field of view.

Here, prior austenite grain boundary in the central portion of the cross-section perpendicular to the rolling contact surface of the bearing washer can be observed, for example, in the following procedure. Initially, the bearing washer is cut in a cross-section perpendicular to the rolling contact surface. Then, the cross-section is mirror polished and immersed in an etchant at a room temperature for 30 minutes for corrosion. Here, an etchant obtained by adding a surfactant to a picric acid saturated aqueous solution may be used as the etchant. Thereafter, the central portion of the cross-section is observed using an optical microscope under magnification of 400×.

The region enclosed by prior austenite grain boundary in the central portion of the cross-section perpendicular to the rolling contact surface of bearing washer 11 for thrust bearing 10 according to Embodiment 7, observed with this observation method, occupies at most 10% of the entire field of view.

A method of manufacturing the bearing washer and the thrust bearing according to Embodiment 7 will now be described. The bearing washer for the thrust bearing and the thrust bearing according to Embodiment 7 can be manufactured with a method similar to that in Embodiments 1 to 5 described above. By adopting such a manufacturing method, in particular by adopting induction heating as described above in the quenching step, a time period for heating in the quenching step can significantly be shortened, as compared with the case employing carburizing heat treatment, bright heat treatment or the like representing a general quench hardening treatment. Consequently, sufficient formation of prior austenite grain boundary can be avoided.

According to the manufacturing method described above, bearing washer 11 for thrust bearing 10 used without being subjected to grinding after quench hardening and implemented by a member obtained by press working a steel plate, in which when a cross-section perpendicular to rolling contact surface 11A of bearing washer 11 is mirror polished and immersed in an etchant obtained by adding a surfactant to a picric acid saturated aqueous solution so as to corrode the mirror polished surface and when a central portion of the cross-section is observed under magnification of 400× using an optical microscope, a region enclosed by prior austenite grain boundary occupies at most 10% of the entire field of view, the surface hardness and the internal hardness are set to at least 653 HV, and a steel containing at least 0.4 mass % to at most 1.2 mass % carbon is used as a material, can be manufactured. In addition, thrust bearing 10 including bearing washer 11 structured as above can be manufactured by using bearing washer 11.

EXAMPLE 1

In the following, Example 1 of the present invention will be described. In a portion to which a maximum load is applied in a contact portion of the rolling contact surface and the rolling element of a roller bearing, plastic deformation may be caused and deformation may remain. As to residual deformation, it has empirically been known that, if the sum of deformation of the rolling element and deformation of the rolling contact surface is not larger than 0.01% of a diameter of the rolling element, deformation does not adversely affect smooth revolution of the bearing or fatigue life.

Here, an experiment to measure allowable static load of the rolling element in the thrust roller bearing according to the present invention and in the conventional thrust roller bearing for comparison of safety factor was conducted.

A procedure for the experiment will be described hereinafter. S55C, SAE1070, SK5, and SUJ2 were selected as materials for the experiment. A disk-shaped bearing washer having an inner diameter of φ25 mm, an outer diameter of φ40 mm and a thickness of 1 mm was fabricated by press working. The induction heat treatment apparatus shown in FIG. 9 was used for heat treatment. Forty bearing washers were stacked and secured, and the stress in a direction pressing the rolling contact surface was applied at least to the entire rolling contact portion of the bearing washer. Then, a high-frequency current (10 KHz) was fed to the induction coil, so as to heat the entire bearing washer to a temperature not lower than Ac point by induction heating. Quenching was performed in such a manner that after a prescribed time period passed, heating was stopped and water was sprayed so as to rapidly cool the bearing washer to a temperature not higher than $M_s$ point. In addition, tempering was performed in such a manner that bearing washer was held in the secured state at a temperature from 220° C. to 230° C. for 10 seconds for induction heating, and thereafter heating was stopped and the bearing washer was air cooled (Examples A to D which will be described later). Some of the bearing washers were no longer secured and were subjected to tempering by being held at a temperature of 160° C. for 2 hours in an atmosphere-controlled (Examples E to H which will be described later).

Meanwhile, SPC, SCM415, SCM420, and SUJ2 were selected as materials for exemplary conventional thrust roller bearings (Comparative Examples A to D which will be described later). The bearing washer was fabricated by press working, as in the present example. The bearing washers made of SPC, SCM415 and SCM420 were quenched in the following manner. Specifically, the bearing washers were held at a temperature of 880° C. for 40 minutes in a carburizing furnace for carburization. Thereafter, the bearing washers were held at a temperature of 820° C. for 10 minutes for diffusion, followed by oil cooling. In addition, the bearing washer made of SUJ2 was quenched and tempered in the following manner. Specifically, the bearing washer was held at a temperature of 850° C. for 40 minutes in a bright heat treatment furnace, and thereafter oil cooled for quenching. Thereafter, the bearing washer was held at a temperature of 160° C. for 2 hours for tempering. Then, the bearing washer was subjected to press tempering (correction with heating) for 1 hour at a temperature of 200° C., so as to mitigate camber/waviness.

Camber/waviness, surface hardness and internal hardness of the bearing washer that had undergone heat treatment as above were measured. Camber/waviness was measured by using a circularity meter with the method described with reference to FIGS. 6 and 7 in Embodiment 1. The surface hardness and the internal hardness were measured by using a Vickers hardness meter (load 1 kgf (9.8N)). As to the surface, hardness, hardness of a portion of the surface of the bearing washer that comes in contact with the roller (the rolling contact portion of the rolling contact surface) was measured. As to the internal hardness, the hardness of the central portion in the cross-section perpendicular to the surface of the bearing washer that comes in contact with the roller was measured.

TABLE 1

| | Material | Heat Treatment | Camber/Waviness Average (range) μm | Camber/Waviness Standard Deviation μm | Surface Hardness HV | Internal Hardness HV |
|---|---|---|---|---|---|---|
| Example A | S55C | Induction heat treatment (Secured during quenching and tempering) | 12 (3 to 20) | 3.2 | 700 | 690 |
| Example B | SAE1070 | Induction heat treatment (Secured during quenching and tempering) | 13 (2 to 23) | 3.8 | 740 | 740 |
| Example C | SK5 | Induction heat treatment (Secured during quenching and tempering) | 17 (3 to 26) | 4.2 | 770 | 770 |
| Example D | SUJ2 | Induction heat treatment (Secured during quenching and tempering) | 18 (3 to 25) | 4.1 | 760 | 760 |
| Example E | S55C | Induction heat treatment (Secured during quenching) | 15 (3 to 30) | 4.8 | 700 | 690 |
| Example F | SAE1070 | Induction heat treatment (Secured during quenching) | 15 (2 to 28) | 4.6 | 740 | 740 |
| Example G | SK5 | Induction heat treatment (Secured during quenching) | 20 (3 to 36) | 5.8 | 770 | 770 |
| Example H | SUJ2 | Induction heat treatment (Secured during quenching) | 22 (3 to 37) | 6.0 | 760 | 760 |
| Comparative Example A | SPC | Carburizing heat treatment (Press tempering) | 78 (52 to 127) | 12.8 | 720 | 180 |
| Comparative Example B | SCM415 | Carburizing heat treatment (Press tempering) | 82 (54 to 146) | 15.8 | 710 | 400 |
| Comparative Example C | SCM420 | Carburizing heat treatment (Press tempering) | 80 (58 to 134) | 13.0 | 710 | 420 |
| Comparative Example D | SUJ2 | Bright heat treatment (Press tempering) | 88 (55 to 168) | 19.1 | 740 | 740 |

Table 1 shows a result of measurement of hardness and camber/waviness of the fabricated bearing washer. Referring to Table 1, values obtained by adding a value three times as large as standard deviation of camber/waviness to an average value of camber/waviness of the bearing washers according to Examples A to H all attained to at most 40 μm. In addition, there was no bearing washer of which camber/waviness was equal to or larger than 40 μm, and a probability of detection of the bearing washer of which camber/waviness was equal to or larger than 40 μm was at most 0.1%. Moreover, the surface hardness and the internal hardness were at least 653 HV.

On the other hand, values obtained by adding a value three times as large as standard deviation of camber/waviness to an average value of camber/waviness of the bearing washers according to Comparative Examples A to D all exceeded 40 μm. In addition, there was no bearing washer of which camber/waviness was smaller than 40 μm, and a probability of detection of the bearing washer of which camber/waviness was equal to or larger than 40 μm was 100%.

The experiment result shown above is the experiment result of the disk-shaped bearing washer having an inner diameter of φ25 mm, an outer diameter of φ40 mm and a thickness of 1 mm. A similar experiment was conducted also with a disk-shaped bearing washer having an inner diameter of φ60 mm, an outer diameter of φ85 mm and a thickness of 1 mm. Consequently, it was confirmed that an effect similar to that with the disk-shaped bearing washer having an inner diameter of φ25 mm, an outer diameter of φ40 mm and a thickness of 1 mm was obtained, such as the maximum value of camber/waviness of the bearing washer fabricated with the heat treatment method according to the manufacturing method of the present invention being 28 μm.

A thrust roller bearing was fabricated, using the bearing washers according to Examples A to H and Comparative Examples A to D. Then, an Amsler testing machine was used to apply a load to the fabricated bearing, for measurement of a load at which the total permanent deformation attains to 0.01% of the diameter of the rolling element. A safety factor was calculated based on the result of measurement. Here, the safety factor is expressed by Equation 1.

$$S_0 = C_0/P_{0max} \quad \text{(Equation 1)}$$

$S_0$: safety factor; $C_0$: basic static rated load; and $P_{0max}$: maximum static load of rolling element It is noted that the lower a value of safety factor is, the more excellent a characteristic of the bearing is.

TABLE 2

| | Material | Heat Treatment | Safety Factor |
|---|---|---|---|
| Example A | S55C | Induction heat treatment (Secured during quenching and tempering) | 1.25 |
| Example B | SAE1070 | Induction heat treatment (Secured during quenching and tempering) | 1.25 |
| Example C | SK5 | Induction heat treatment (Secured during quenching and tempering) | 1.00 |
| Example D | SUJ2 | Induction heat treatment (Secured during quenching and tempering) | 1.00 |
| Example E | S55C | Induction heat treatment (Secured during quenching) | 1.25 |
| Example F | SAE1070 | Induction heat treatment (Secured during quenching) | 1.25 |
| Example G | SK5 | Induction heat treatment (Secured during quenching) | 1.00 |
| Example H | SUJ2 | Induction heat treatment (Secured during quenching) | 1.00 |
| Comparative Example A | SPC | Carburizing heat treatment (Press tempering) | 3.00 |
| Comparative Example B | SCM415 | Carburizing heat treatment (Press tempering) | 2.00 |
| Comparative Example C | SCM420 | Carburizing heat treatment (Press tempering) | 2.00 |
| Comparative Example D | SUJ2 | Bright heat treatment (Press tempering) | 1.25 |

Table 2 shows a result of the experiment. Referring to Table 2, Examples A to H according to the present invention attain a value of the safety factor smaller than that in Comparative Examples A to C. The reason may be considered as follows. Specifically, in Comparative Examples A to C, solely the surface portion of the bearing washer was hardened, whereas in Examples A to H of the present invention, the bearing washer was uniformly hardened from the surface to the inside. Accordingly, plastic deformation was less likely in the bearing washer, and allowable static load of the rolling element was increased.

Meanwhile, the bearing washer according to Comparative Example D and the bearing washers according to Examples D and H were fabricated with the same material, and they were hardened to the inside. In Examples D and H, however, the value of the safety factor is smaller than in Comparative Example D. The reason may be considered as follows.

In Examples D and H, heating at the time of quenching was carried out by induction heating. Therefore, a time period until the temperature is raised to a level not lower than $A_{c1}$ point was significantly shorter than in Comparative Example D in which bright heat treatment was employed. Consequently, in Examples D and H, formation of austenite boundary progressed to a lesser extent than in Comparative Example D. Therefore, it is considered that deformation resistance in Examples D and H was larger than in Comparative Example D, allowable static load of the rolling element was improved, and the value of the safety factor was lowered.

The austenite grain boundary was observed in the following procedure. Initially, the bearing washer was cut in a cross-section perpendicular to the rolling contact surface. Then, the cross-section was mirror polished and immersed in an etchant at a room temperature for 30 minutes for corrosion. Here, an etchant obtained by adding a surfactant to a picric acid saturated aqueous solution (JIS G 0551 annex 1) was used as the etchant. Thereafter, the central portion in the cross-section was observed using an optical microscope under magnification of 400×.

Figure 47:
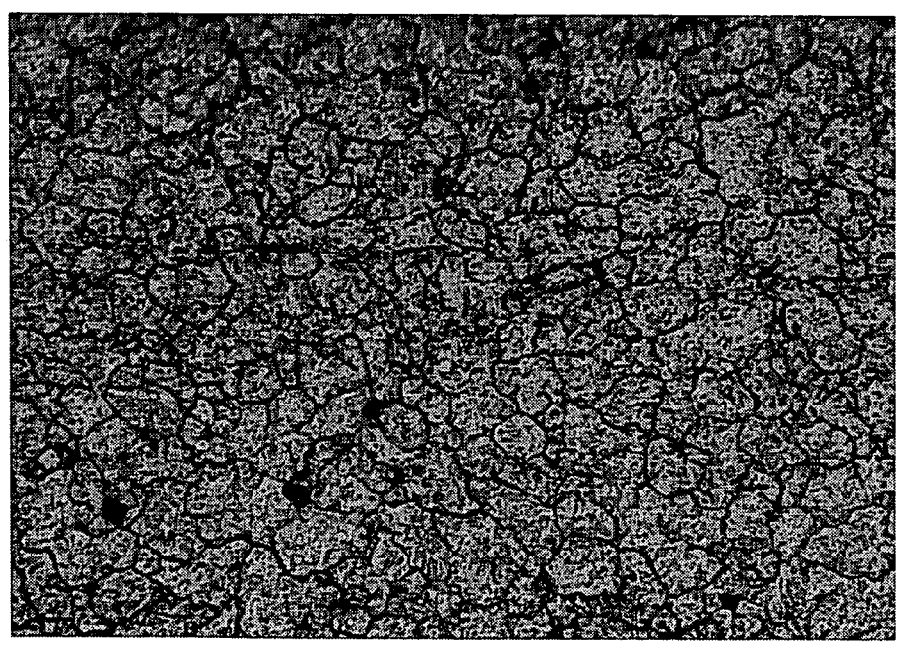
FIG. 47 is an optical microscope photograph of prior austenite grain boundary in a central portion in a cross-section perpendicular to a rolling contact surface of a bearing washer included in a conventional thrust bearing.
Figure 48:
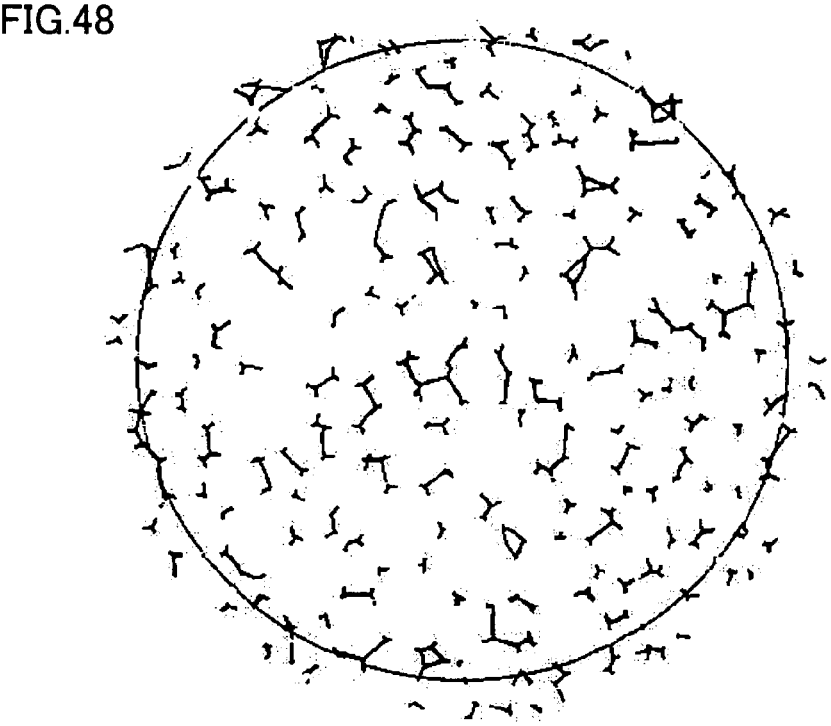
FIG. 48 is a schematic diagram of the prior austenite grain boundary in FIG. 46.
Figure 49:
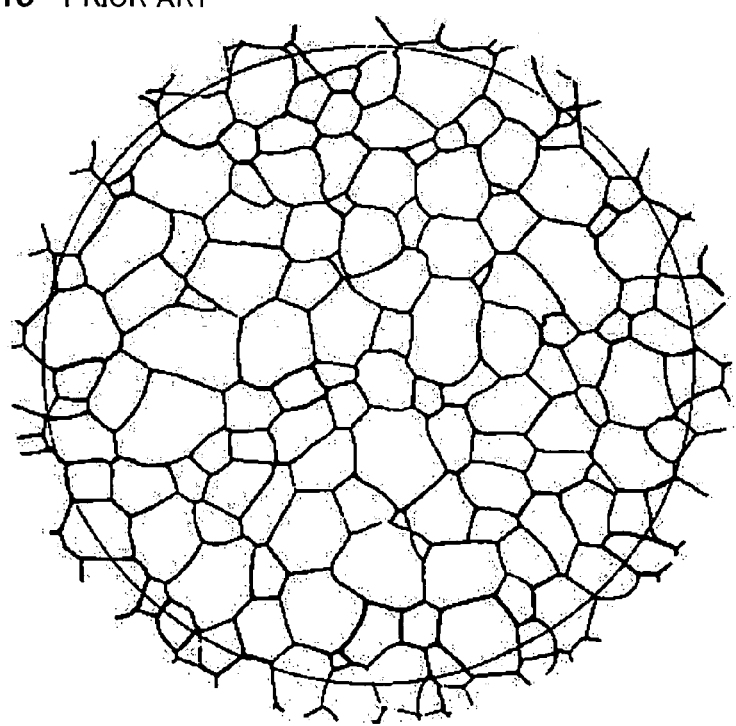
FIG. 49 is a schematic diagram of the prior austenite grain boundary in FIG. 47.

Referring to FIGS. 46 to 49, the austenite grain boundary is clearly observed in Comparative Example D shown in FIG. 47, while the grain boundary is unclear in Example D shown in FIG. 46. The grain boundary was clearly observed, probably because formation of grain boundary sufficiently progressed as shown in FIG. 49 in Comparative Example D in FIG. 47. In contrast, it is considered that grain boundary was not clearly observed in Example D shown in FIG. 46, because formation of grain boundary did not sufficiently progress as shown in FIG. 48. Based on such observation, it is confirmed that formation of the grain boundary progressed in Example D to a lesser extent than in Comparative Example D.

In addition, in Comparative Example D, the intergranular oxidation layer was formed as a result of bright heat treatment performed in the quenching step. On the other hand, in Example D, as induction heating lasting for a short period of time was adopted in the quenching step, the intergranular oxidation layer was hardly formed. Accordingly, the surface portion of the bearing washer in Example D had deformation resistance higher than in Comparative Example D. Consequently, it is considered that allowable static load of the rolling element in Example D was higher than in Comparative Example D and the value of the safety factor was lower.

Here, the area around the surface of the bearing washer was observed in the following procedure. Initially, the bearing washer was cut in a cross-section perpendicular to the rolling contact surface. Then, the cross-section was mirror polished and immersed in a 3% nital at a room temperature for corrosion. A time period for immersion was set, for example, to approximately 2 to 10 seconds. As susceptibility to corrosion is different depending on a type of the steel, a time period for immersion appropriate for each bearing washer was set, considering progress of corrosion. Thereafter, the surface portion directly under the rolling contact surface was observed by using an optical microscope.

Referring to FIGS. 44 and 45, it is confirmed that the intergranular oxidation layer to a thickness of approximately 5 μm was observed in Comparative Example D in FIG. 45, whereas the intergranular oxidation layer was not observed in Example D in FIG. 44.

EXAMPLE 2

In the following, Example 2 of the present invention will be described. An experiment to compare a life of the thrust roller bearing according to the present invention with a life of the conventional thrust roller bearing was conducted.

A procedure for the experiment will be described hereinafter. The bearing washers according to Examples A to H and Comparative Examples A to D fabricated in Example 1 were used to fabricate a thrust roller bearing. This thrust roller bearing was subjected to a life test under a condition of thrust load of 4 kN, a revolution speed of 5000 r/min, and the use of lubricating oil VG2.

TABLE 3

| | Material | Heat Treatment | Life Ratio |
|---|---|---|---|
| Example A | S55C | Induction heat treatment (Secured during quenching and tempering) | 3.2 |
| Example B | SAE1070 | Induction heat treatment (Secured during quenching and tempering) | 4.4 |
| Example C | SK5 | Induction heat treatment (Secured during quenching and tempering) | 3.5 |
| Example D | SUJ2 | Induction heat treatment (Secured during quenching and tempering) | 4.8 |
| Example E | S55C | Induction heat treatment (Secured during quenching) | 3.2 |
| Example F | SAE1070 | Induction heat treatment (Secured during quenching) | 4.4 |
| Example G | SK5 | Induction heat treatment (Secured during quenching) | 3.3 |
| Example H | SUJ2 | Induction heat treatment (Secured during quenching) | 4.5 |
| Comparative Example A | SPC | Carburizing heat treatment (Press tempering) | 1.0 |
| Comparative Example B | SCM415 | Carburizing heat treatment (Press tempering) | 1.5 |
| Comparative Example C | SCM420 | Carburizing heat treatment (Press tempering) | 1.5 |
| Comparative Example D | SUJ2 | Bright heat treatment (Press tempering) | 1.5 |

Table 3 shows a result of the life test. The result of the test is shown by using a life ratio, assuming a life of the bearing in Comparative Example A as 1.

Referring to Table 3, the life of the bearing in Examples A to H was longer than twice that in Comparative Examples A to D. The reason may be considered as follows.

As described above, since camber/waviness of the bearing washer in Examples A to H is smaller than in Comparative Examples A to D, partial contact between the roller and the bearing washer does not take place. Consequently, it is considered that disruption in an oil film or local increase in a contact pressure did not occur and a long life was achieved. In addition, as shown in Table 1, camber/waviness of the bearing washer in Examples A to H was not larger than 40 μm, whereas camber/waviness of the bearing washer in Comparative Examples A to D was not smaller than 50 μm. Namely, it is considered that a long life of the bearing was achieved, because camber/waviness of the bearing washer in Examples A to H was not larger than 40 μm and allowable static load of the rolling element in Examples A to H was higher than in Comparative Examples as described previously.

In addition, as described above, since formation of austenite grain boundary in Examples A to H progressed to a lesser extent than in Comparative Examples A to D, resistance to occurrence and development of cracking is larger. Consequently, occurrence and development of cracking originating from the surface caused by slip of the roller is suppressed. Moreover, occurrence and development of internally originating cracking is also suppressed. It is considered that a long life was achieved as a result of such an effect as suppression of occurrence and development of cracking.

The intergranular oxidation layer was formed in the surface portion of the bearing washer through carburizing treatment or bright heat treatment performed in the quenching step in Comparative Examples A to D, whereas the intergranular oxidation layer-was hardly formed in Examples A to H, because induction heating lasting for a short period of time was adopted in the quenching step. Therefore, it is considered that a long life was achieved because occurrence of surface-originating cracking was suppressed.

From the foregoing, it can be seen that the thrust bearing according to the present invention attains a life longer than the conventional thrust bearing.

EXAMPLE 3

In the following, Example 3 of the present invention will be described. An experiment to compare an acoustic feature of the thrust roller bearing according to the present invention with an acoustic feature of the conventional thrust roller bearing was conducted. A procedure of the experiment will be described hereinafter.

The bearing washers according to Examples A to H and Comparative Examples A to D fabricated in Example 1 were used to fabricate a thrust roller bearing. A test to measure noise level of the bearing was conducted under a condition in accordance with Japanese Industrial Standards (JIS B 1548) except for a condition of thrust load of 100N and a revolution speed of 1800 r/min.

Figure 50:
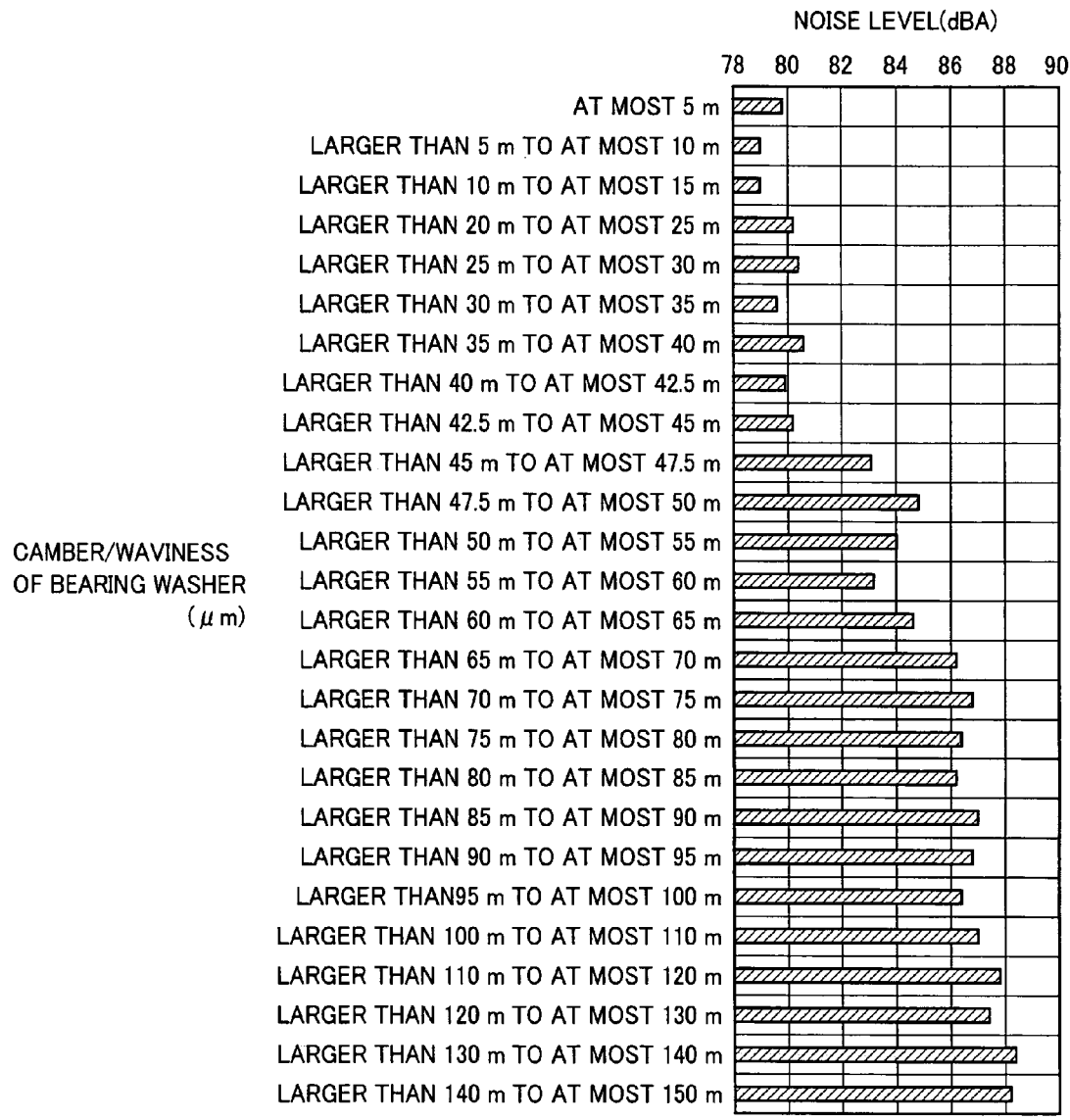
FIG. 50 shows relation between noise and camber/waviness of a bearing washer for a thrust roller bearing.

Referring to FIG. 50, relation between noise and camber/waviness of the bearing washer for the thrust roller bearing will be described. It is noted that noise level in each camber/waviness range in FIG. 50 represents an average obtained through acoustic measurement with regard to 10 bearings.

Referring to FIG. 50, it is not that the noise level gradually increases with the increase in camber/waviness. Specifically, if camber/waviness is not larger than 40 μm, the noise level attains to approximately 79 to 81 dBA. Meanwhile, if camber/waviness is around 40 to 50 μm, the noise level becomes higher, and if camber/waviness is larger than that, the noise level is not lower than approximately 84 dBA. Therefore, it is considered that a critical value is present somewhere in a value range of camber/waviness of the bearing washer from 40 to 50 μm. Therefore, it can be seen that it is important to ensure suppression of camber/waviness to a level not larger than 40 μm in the thrust roller bearing used in an application in which the acoustic feature is valued.

The bearing washer for the thrust bearing and the thrust bearing according to the present invention are particularly advantageously adapted to a bearing washer for a thrust bearing manufactured by quench hardening and used without being subjected to grinding after quenching as well as to a thrust bearing including the bearing washer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A bearing washer group for a thrust bearing, comprising:
a plurality of bearing washers for a thrust bearing manufactured by quench hardening and used without being subjected to grinding after said quench hardening; wherein
when camber/waviness of each bearing washer constituting said bearing washer group that is randomly extracted is measured, a value obtained by adding a value three times as large as standard deviation of camber/waviness to an average value of camber/waviness is at most 40 μm.

2. The bearing washer group for a thrust bearing according to claim 1, wherein said bearing washer has a surface hardness of at least 653 HV, and said bearing washer has an internal hardness of at least 653 HV.

3. The bearing washer group for a thrust bearing according to claim 1, wherein said bearing washer uses, as a material, a steel containing at least 0.4 mass % to at most 1.2 mass % carbon.

4. The bearing washer group for a thrust bearing according to claim 1, wherein said bearing washer is implemented by a member obtained by press working a steel plate.

5. A thrust bearing comprising the bearing washer constituting the hearing washer group according to claim 1.

6. A bearing washer group for a thrust bearing, comprising:

a plurality of bearing washers for a thrust bearing manufactured by quench hardening and used without being subjected to grinding after said quench hardening; wherein when camber/waviness washer of each bearing washer group constituting said bearing washer group that is randomly extracted is measured, a probability of detection of the bearing washer of which camber/waviness is equal to or larger than 40 μm is at most 0.1%.

7. The bearing washer group for a thrust bearing according to claim 6, wherein said bearing washer has a surface hardness of at least 653 HV, and said bearing washer has an internal hardness of at least 653 HV.

8. The bearing washer group for a thrust bearing according to claim 6, wherein said bearing washer uses, as a material, a steel containing at least 0.4 mass % to at most 1.2 mass % carbon.

9. The bearing washer group for a thrust bearing according to claim 6, wherein said bearing washer is implemented by a member obtained by press working a steel plate.

10. A thrust bearing comprising the bearing washer constituting the bearing washer group according to claim 6.

11. A bearing washer for a thrust bearing manufactured by quench hardening and used without being subjected to grinding after said quench hardening; wherein an intergranular oxidation layer in a surface portion of said bearing washer has a thickness of at most 1 μm; wherein when camber/waviness of the bearing washer randomly extracted from bearing washer group is measured, a probability of detection of the bearing washer of which camber/waviness is equal to or larger than 40 μm is at most 0.1%.

12. The bearing washer group for a thrust bearing according to claim 11, wherein said bearing washer has a surface hardness of at least 653 HV, and said bearing washer has an internal hardness of at least 653 HV.

13. The bearing washer group for a thrust bearing according to claim 11, wherein said bearing washer uses, as a material, a steel containing at least 0.4 mass % to at most 1.2 mass % carbon.

14. The bearing washer group for a thrust bearing according to claim 11, wherein said bearing washer is implemented by a member obtained by press working a steel plate.

15. A thrust bearing comprising the bearing washer according to claim 11.

* * * * *